US009904062B2

(12) United States Patent
Asakura et al.

(10) Patent No.: US 9,904,062 B2
(45) Date of Patent: Feb. 27, 2018

(54) SUBSTRATE LAMINATING APPARATUS, SUBSTRATE LAMINATING METHOD, AND STEREOSCOPIC DISPLAY DEVICE

(71) Applicant: NLT TECHNOLOGIES, LTD., Kanagawa (JP)

(72) Inventors: Tetsuroh Asakura, Kanagawa (JP); Koji Shigemura, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 4 days.

(21) Appl. No.: 14/640,558

(22) Filed: Mar. 6, 2015

(65) Prior Publication Data
US 2015/0253580 A1 Sep. 10, 2015

(30) Foreign Application Priority Data

Mar. 6, 2014 (JP) .................. 2014-044431

(51) Int. Cl.
*G02B 27/22* (2006.01)
*B32B 37/00* (2006.01)
(Continued)

(52) U.S. Cl.
CPC .......... *G02B 27/2214* (2013.01); *B32B 33/00* (2013.01); *B32B 37/0046* (2013.01);
(Continued)

(58) Field of Classification Search
CPC . G02B 27/2214; B32B 33/00; B32B 37/0046; B32B 37/1009; B32B 37/1018; B32B 37/18; B32B 38/1833; B32B 38/1841; B32B 37/12; B32B 38/1858; B32B 41/00; B32B 307/40;
(Continued)

(56) References Cited

U.S. PATENT DOCUMENTS

2009/0124158 A1* 5/2009 Hwang .................. B32B 38/162
445/24
2012/0090786 A1* 4/2012 Jeong .................. B32B 38/1833
156/350

FOREIGN PATENT DOCUMENTS

JP          2001-5405 A       1/2001
JP       2008-286886 A      11/2008
(Continued)

OTHER PUBLICATIONS

Communication dated Oct. 31, 2017 from the Japanese Patent Office in counterpart application No. 2014-044431.

*Primary Examiner* — Jade R Chwasz

(74) *Attorney, Agent, or Firm* — Sughrue Mion, PLLC

(57) ABSTRACT

To provide a substrate laminating apparatus and a substrate laminating method capable of laminating two substrates highly precisely while achieving low cost and saving space. The substrate laminating apparatus includes an upper-substrate camera group provided to a lower vacuum chamber for capturing an image of an upper substrate fixed to an upper vacuum chamber. The upper-substrate camera group captures images of a first upper-substrate alignment mark and a second upper-substrate alignment mark of the upper substrate fixed to the upper vacuum chamber by actions synchronized with the lower vacuum chamber. Thereby, it is possible to save the space and to lower the cost by reducing the number of mechanical components.

7 Claims, 20 Drawing Sheets

(51) Int. Cl.
  *B32B 37/10* (2006.01)
  *B32B 37/18* (2006.01)
  *B32B 38/18* (2006.01)
  *G02B 27/62* (2006.01)
  *B32B 33/00* (2006.01)
  *B32B 41/00* (2006.01)
  *B32B 37/12* (2006.01)

(52) U.S. Cl.
  CPC ...... *B32B 37/1009* (2013.01); *B32B 37/1018* (2013.01); *B32B 37/18* (2013.01); *B32B 38/1833* (2013.01); *B32B 38/1841* (2013.01); *G02B 27/62* (2013.01); *B32B 37/12* (2013.01); *B32B 38/1858* (2013.01); *B32B 41/00* (2013.01); *B32B 2307/40* (2013.01); *B32B 2309/68* (2013.01); *B32B 2309/72* (2013.01); *B32B 2457/20* (2013.01)

(58) Field of Classification Search
  CPC .............. B32B 2309/68; B32B 309/72; B32B 2457/20; B32B 37/10; B32B 37/14; B32B 37/0053; B32B 37/025; B32B 37/142; B32B 37/185; B32B 37/187; B32B 37/30; H04N 13/0404; H04N 13/0409; H04N 13/0207
  USPC ........................................ 359/463, 462, 477
  See application file for complete search history.

(56) References Cited

FOREIGN PATENT DOCUMENTS

| | | |
|---|---|---|
| JP | 4192181 B2 | 12/2008 |
| JP | 4330912 B2 | 9/2009 |
| JP | 2009-258582 A | 11/2009 |
| JP | 2010-20068 A | 1/2010 |
| JP | 2012-13933 A | 1/2012 |
| JP | 2012-133098 A | 7/2012 |
| WO | 2010/026768 A1 | 3/2010 |

* cited by examiner

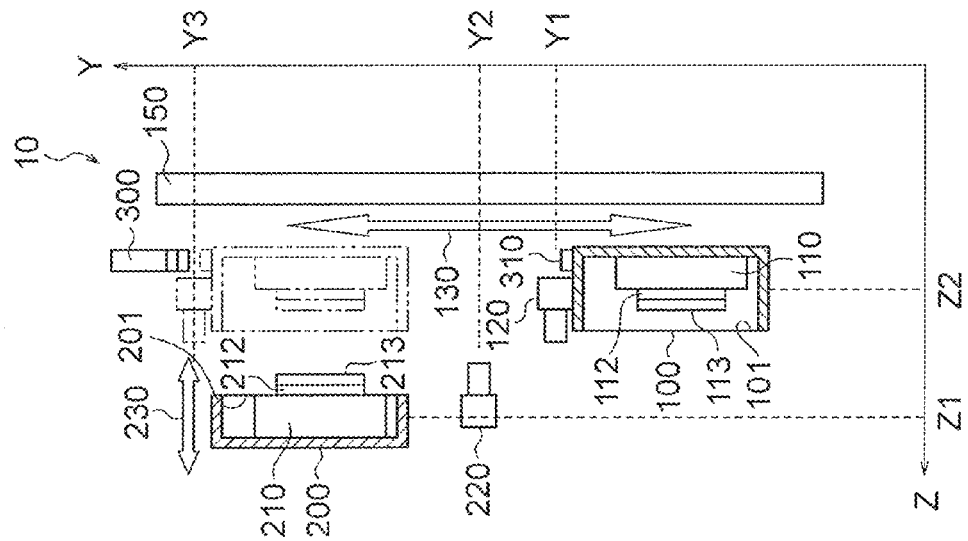
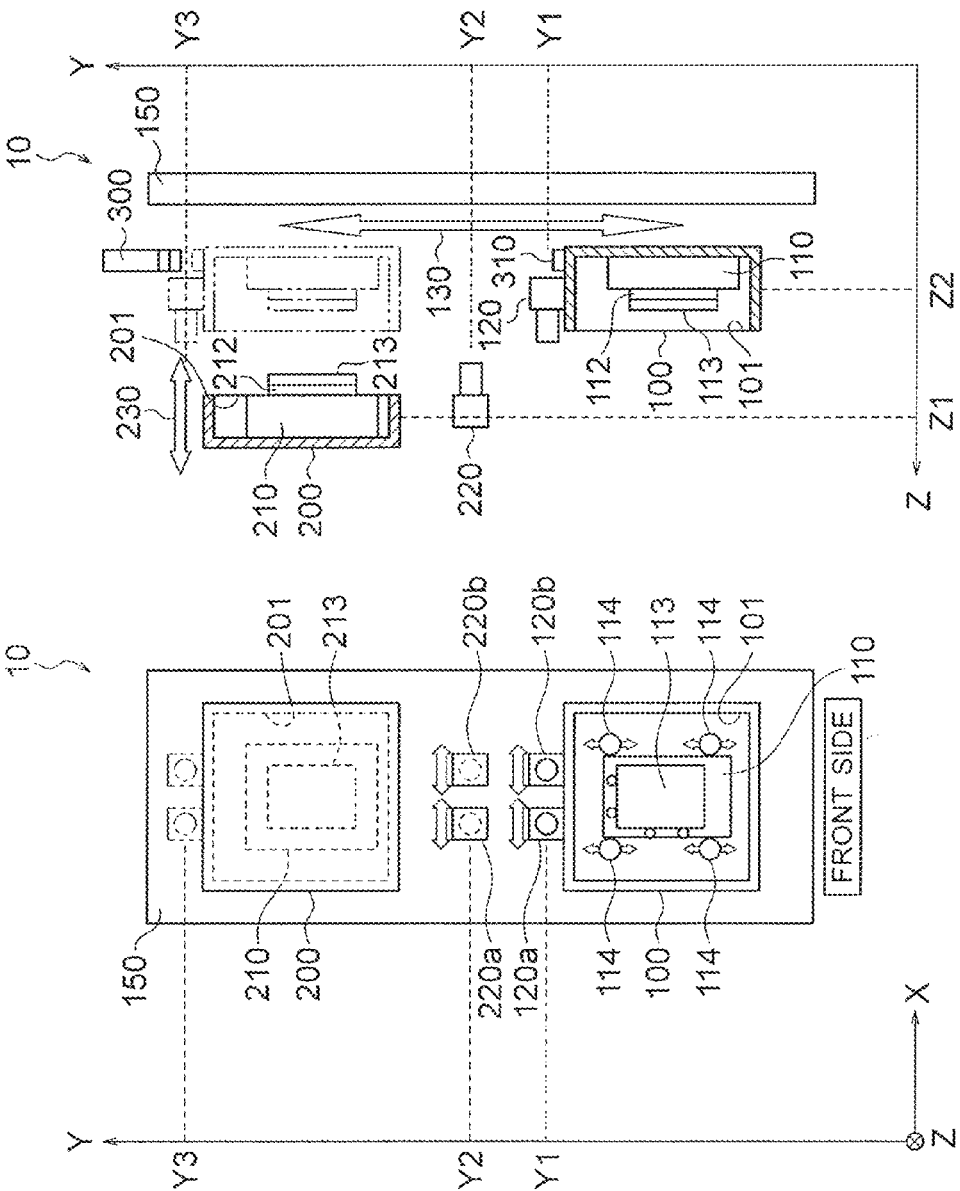

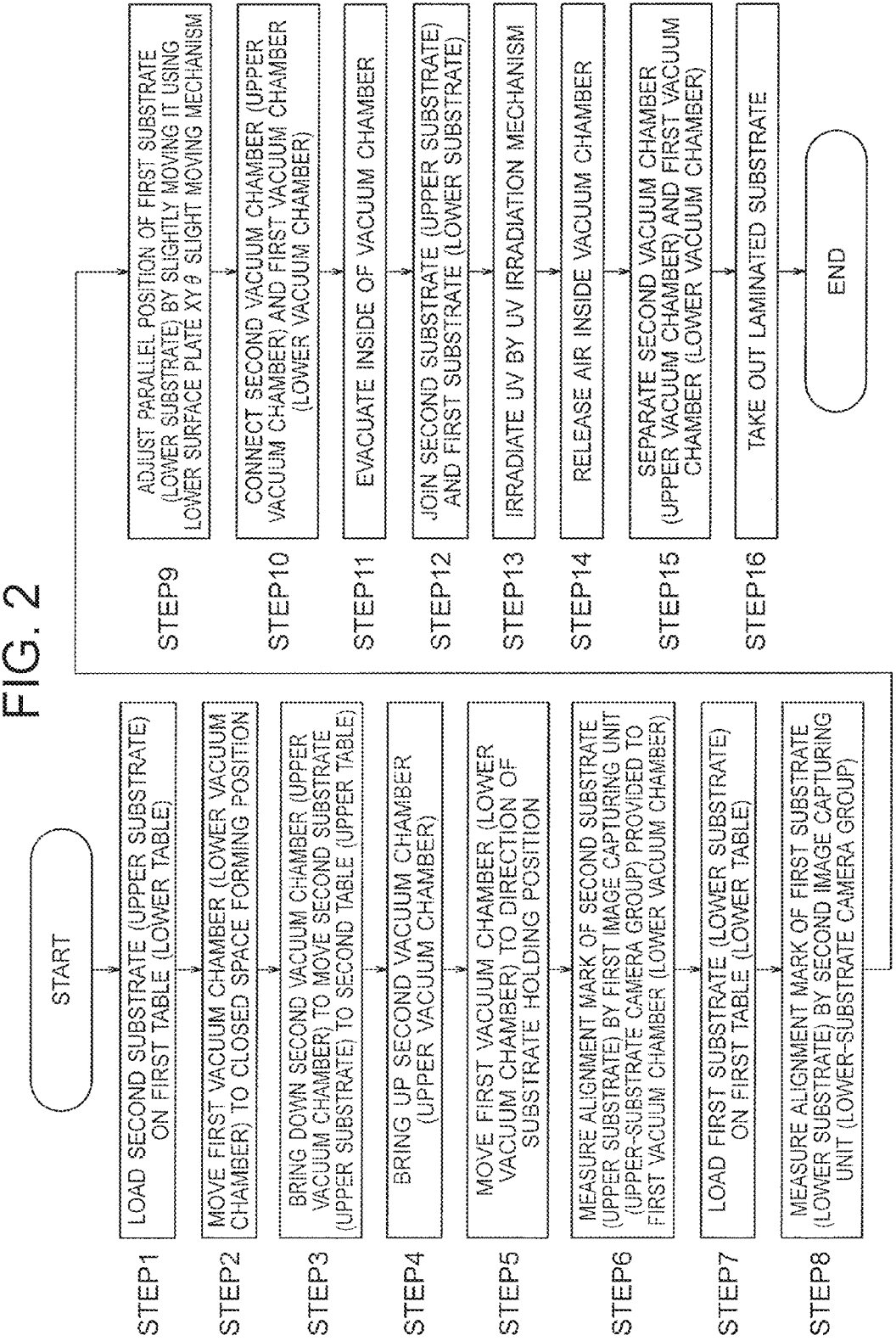

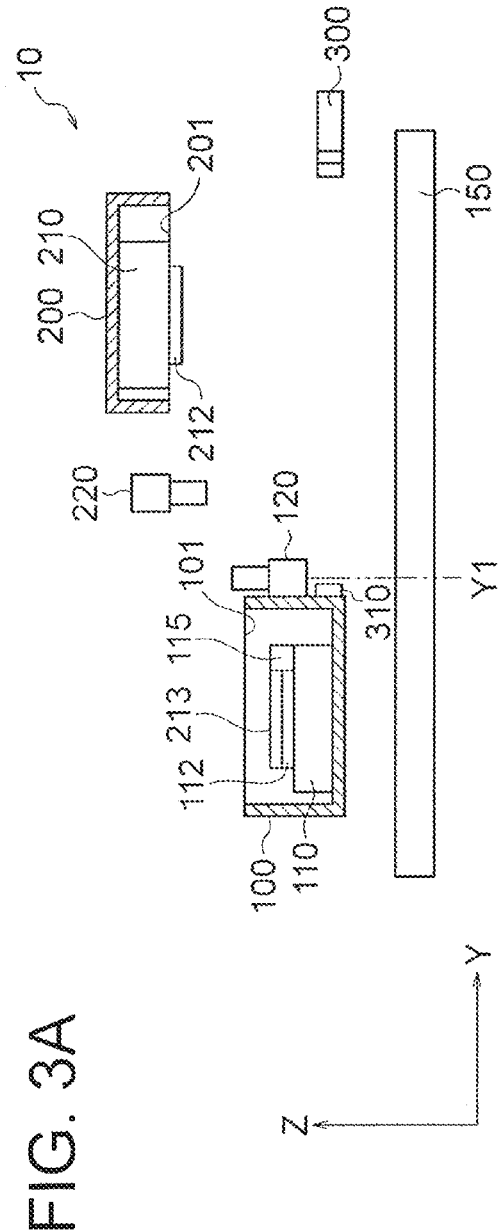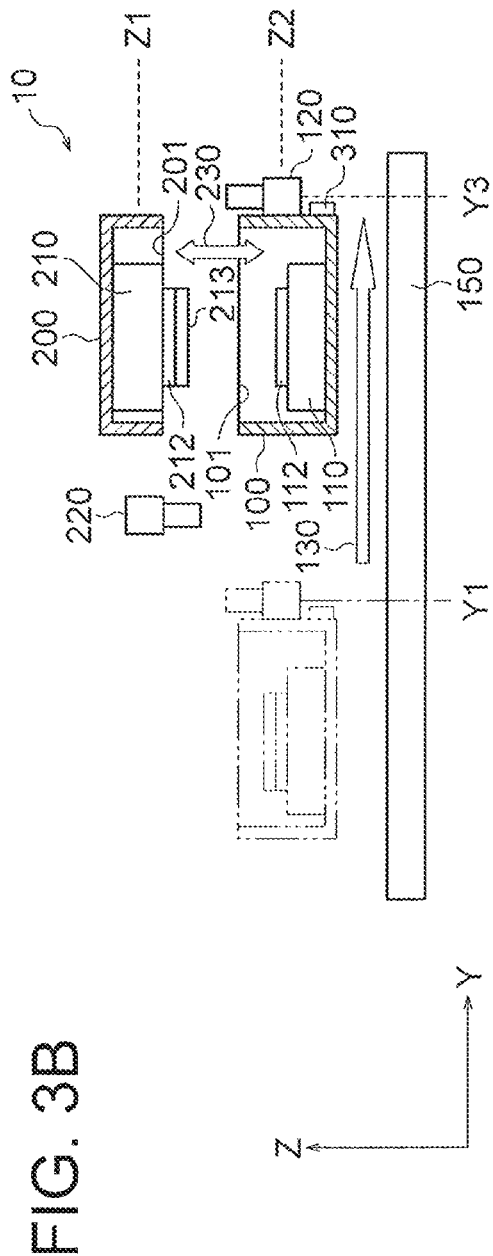
FIG. 3A
FIG. 3B

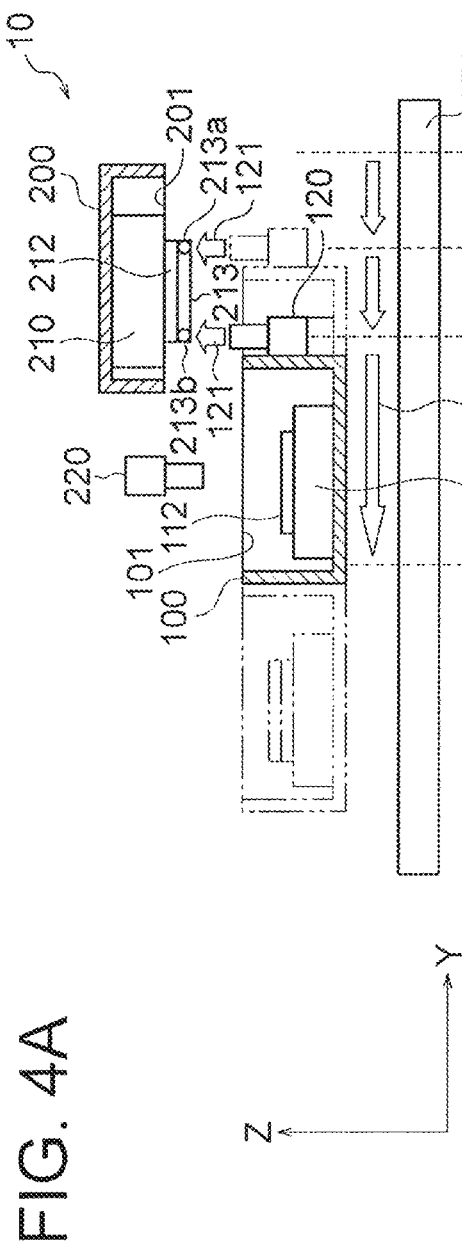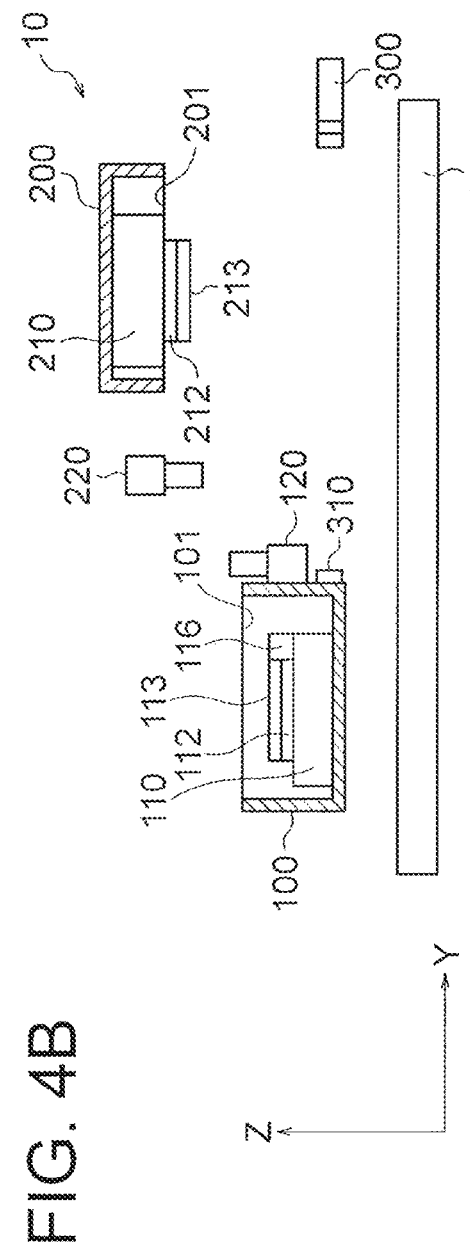

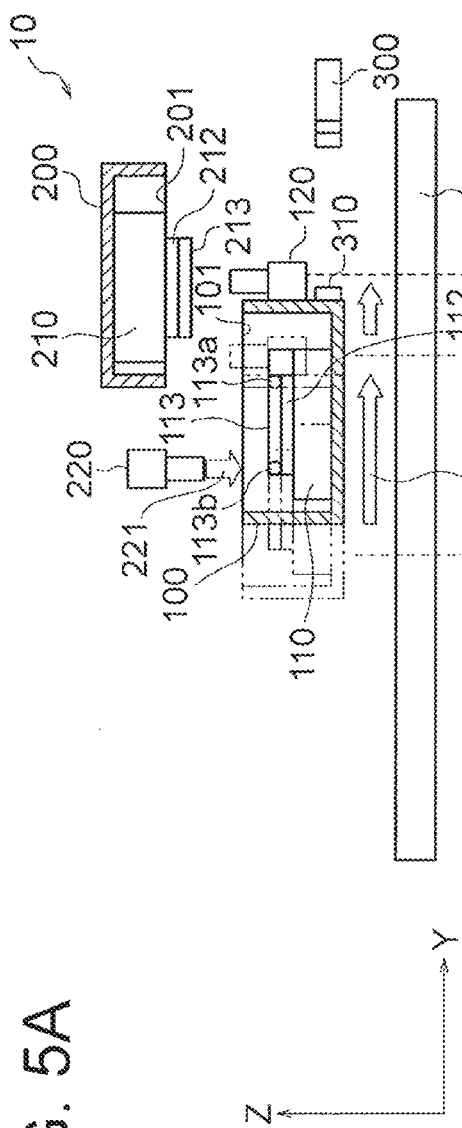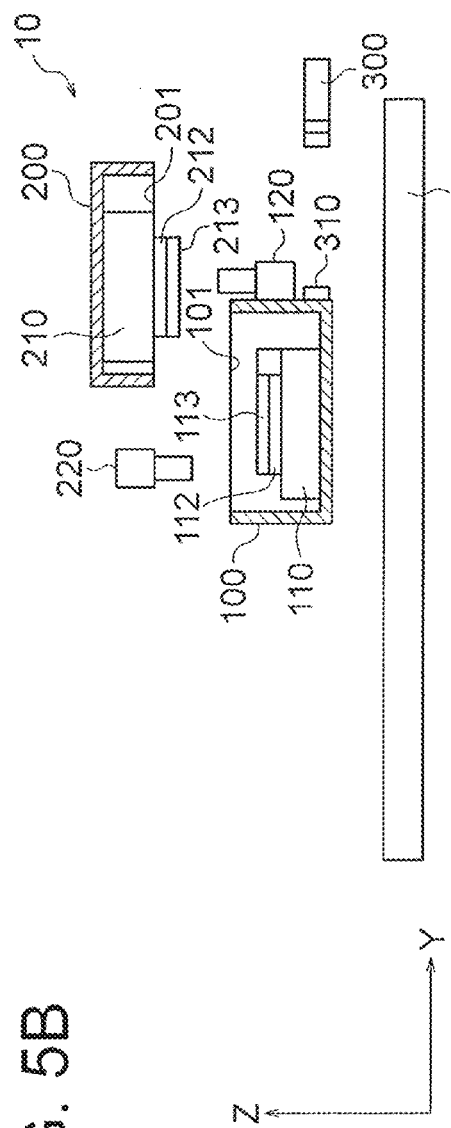

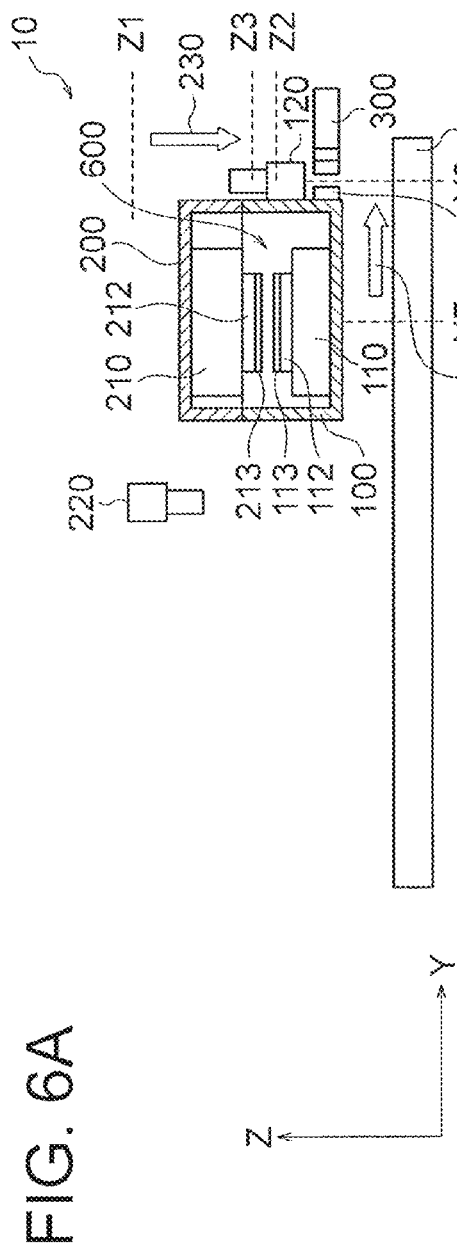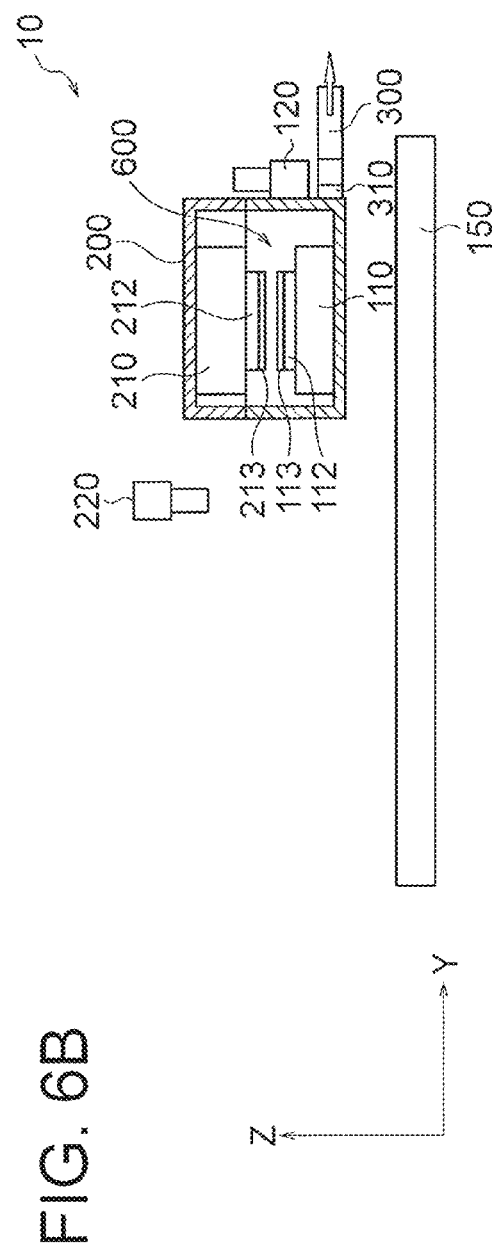

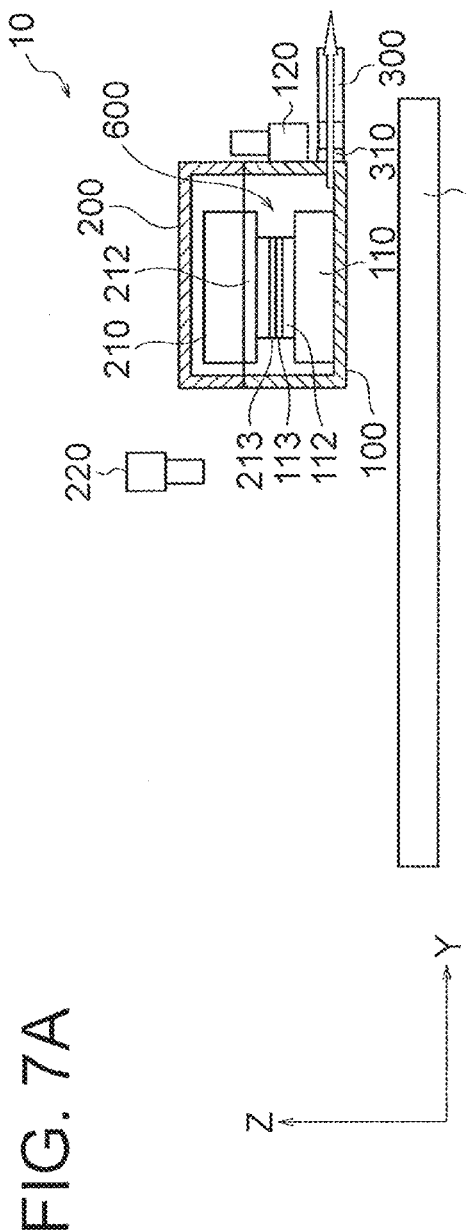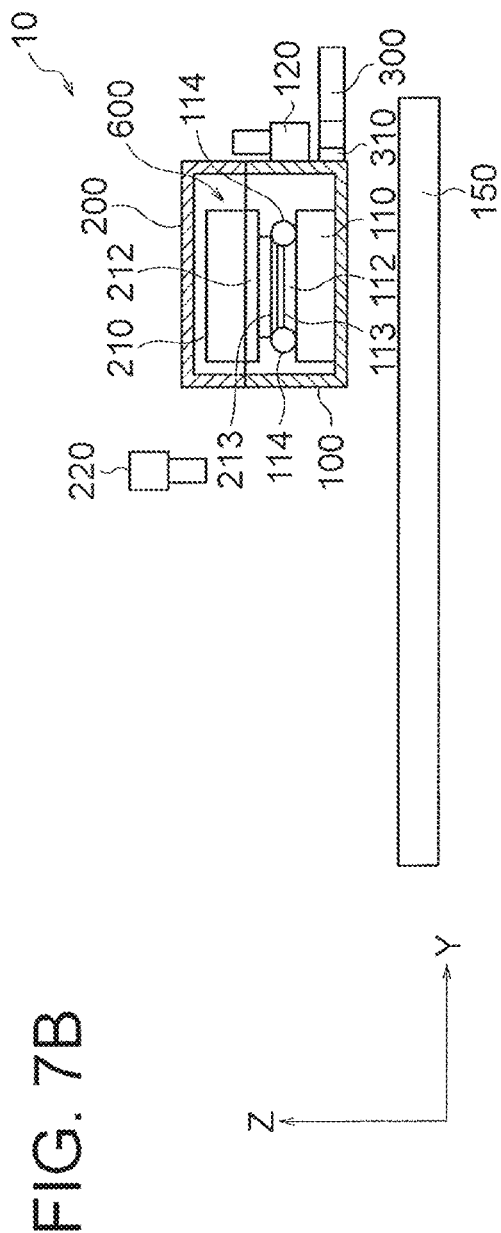

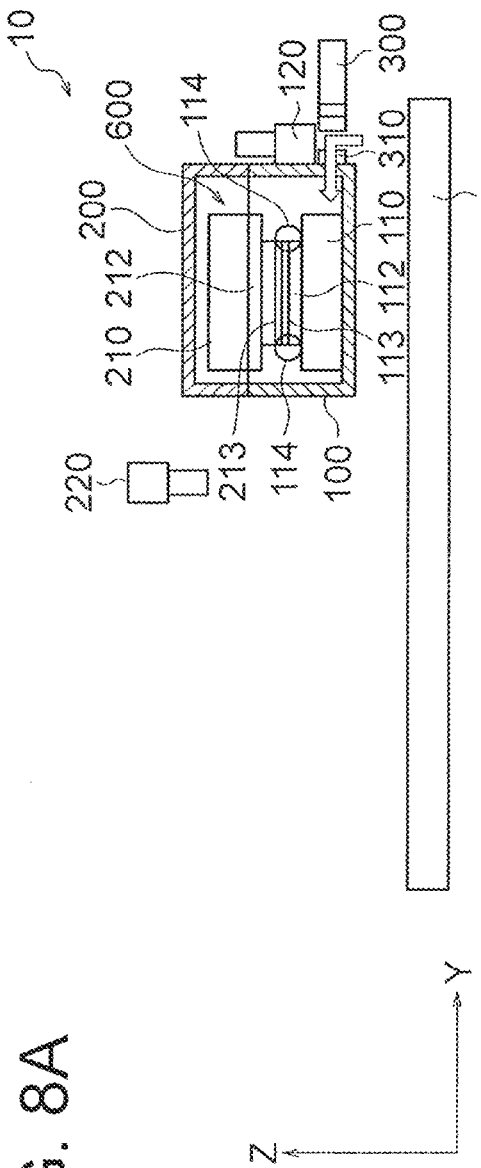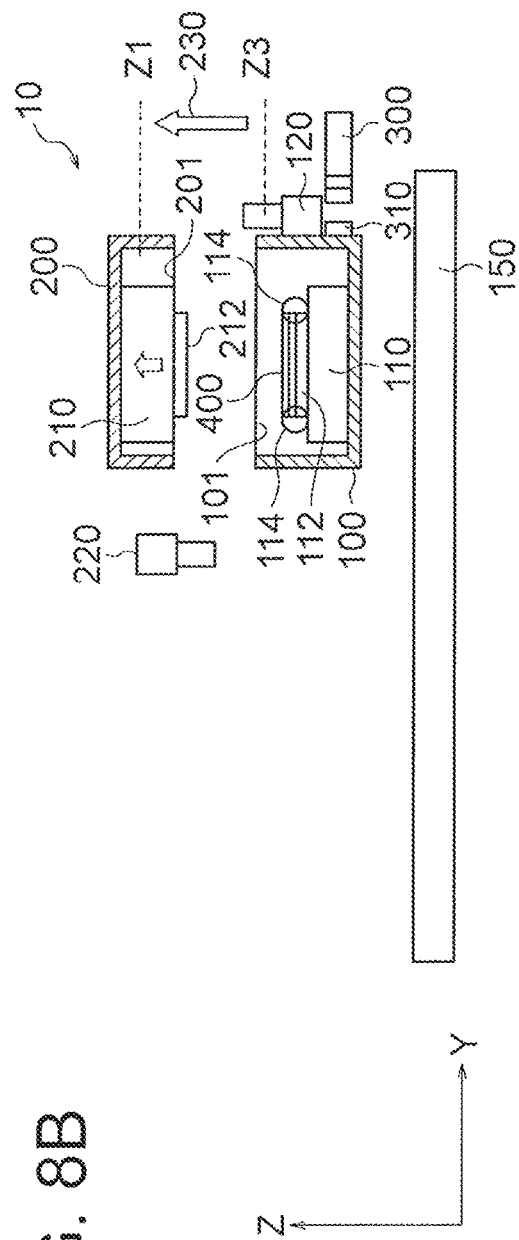

FIG. 10

| | FIRST EXEMPLARY EMBODIMENT | MODIFICATION EXAMPLE |
|---|---|---|
| FIRST VACUUM CHAMBER | LOWER VACUUM CHAMBER | UPPER VACUUM CHAMBER |
| SECOND VACUUM CHAMBER | UPPER VACUUM CHAMBER | LOWER VACUUM CHAMBER |
| FIRST TABLE | LOWER TABLE | UPPER TABLE |
| SECOND TABLE | UPPER TABLE | LOWER TABLE |
| FIRST SUBSTRATE | LOWER SUBSTRATE E.G., DISPLAY PANEL | UPPER SUBSTRATE E.G., DISPLAY PANEL |
| SECOND SUBSTRATE | UPPER SUBSTRATE E.G., OPTICAL SUBSTRATE | LOWER SUBSTRATE E.G., OPTICAL SUBSTRATE |
| FIRST IMAGE CAPTURING UNIT | UPPER-SUBSTRATE CAMERA GROUP FIXED TO FIRST VACUUM CHAMBER TO MEASURE ALIGNMENT MARK OF UPPER SUBSTRATE | LOWER-SUBSTRATE CAMERA GROUP FIXED TO FIRST VACUUM CHAMBER TO MEASURE ALIGNMENT MARK OF LOWER SUBSTRATE |
| SECOND IMAGE CAPTURING UNIT | LOWER-SUBSTRATE CAMERA GROUP MEASURE ALIGNMENT MARK OF LOWER SUBSTRATE | UPPER-SUBSTRATE CAMERA GROUP MEASURE ALIGNMENT MARK OF UPPER SUBSTRATE |
| Y-AXIS SERVO | CONNECTED TO FIRST VACUUM CHAMBER | CONNECTED TO FIRST VACUUM CHAMBER |
| Z-AXIS SERVO | CONNECTED TO SECOND VACUUM CHAMBER | CONNECTED TO SECOND VACUUM CHAMBER |

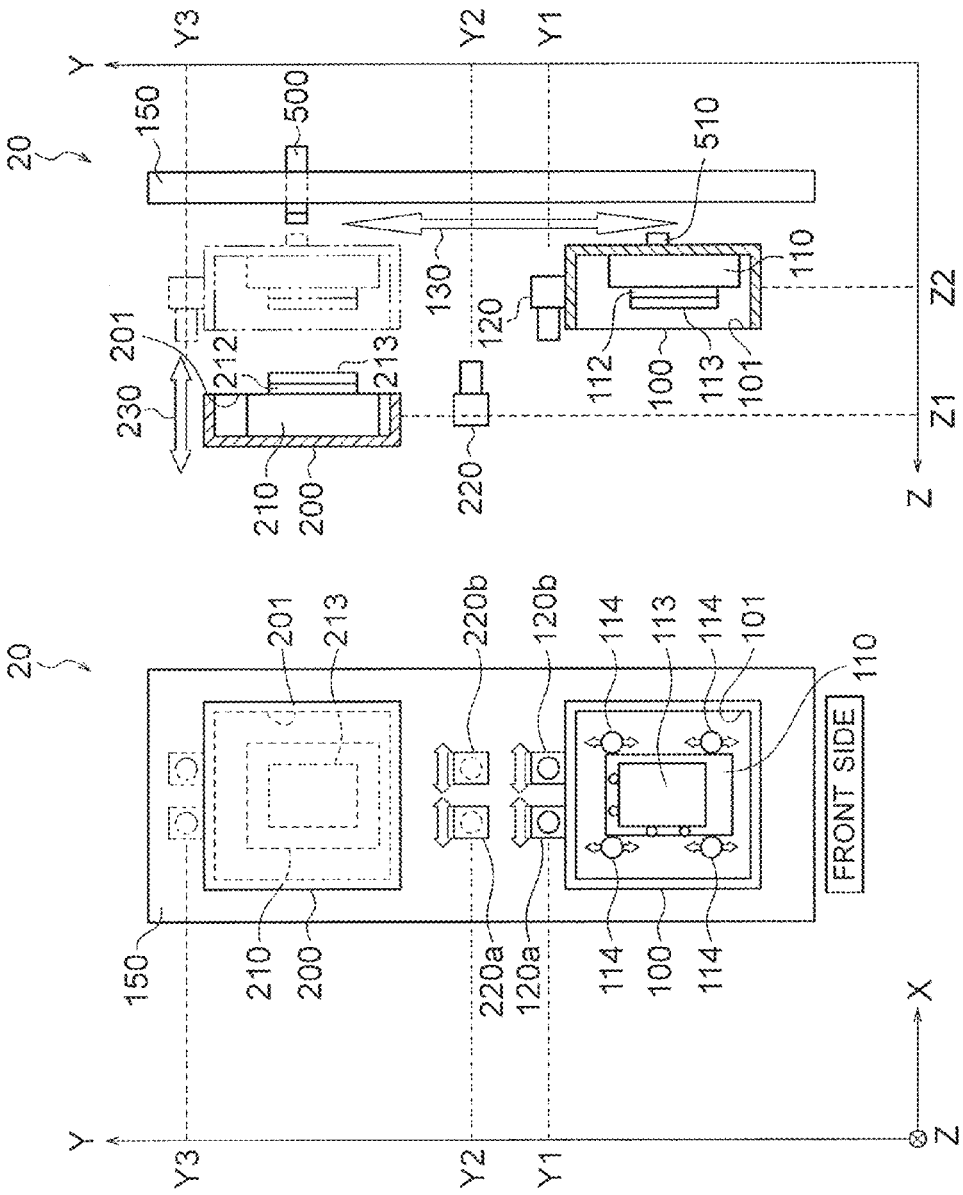

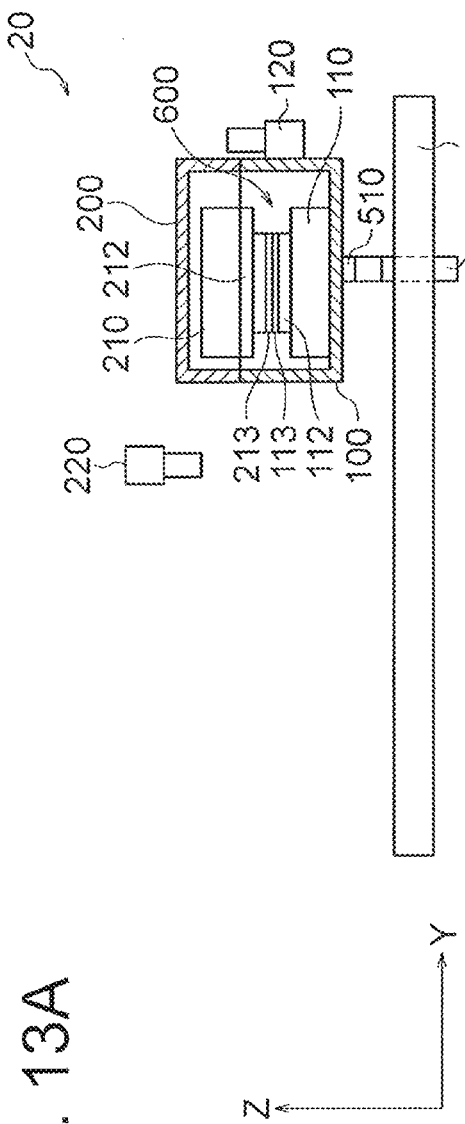
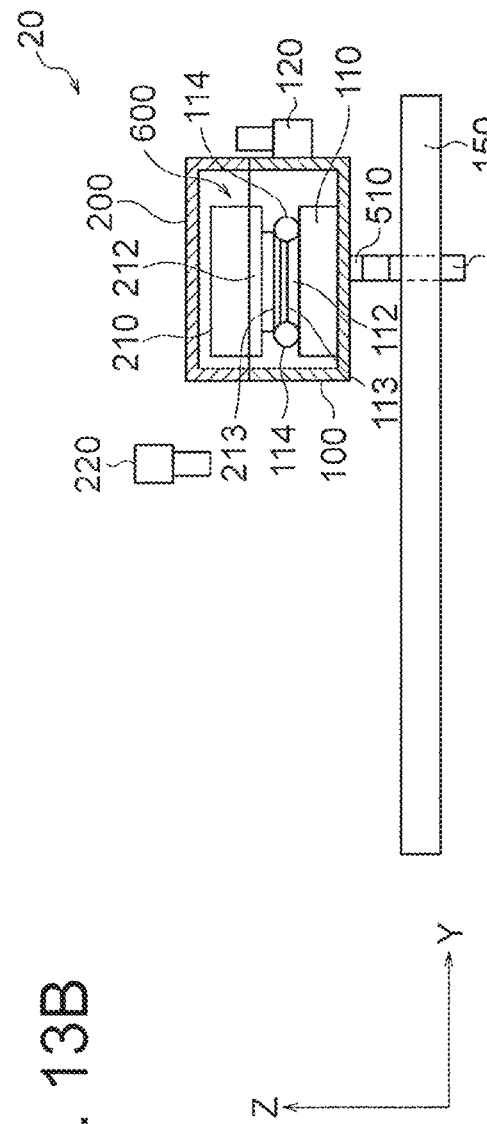
FIG. 13A
FIG. 13B

SUBSTRATE LAMINATING APPARATUS, SUBSTRATE LAMINATING METHOD, AND STEREOSCOPIC DISPLAY DEVICE

CROSS-REFERENCE TO RELATED APPLICATION

This application is based upon and claims the benefit of priority from Japanese patent application No. 2014-044431, filed on Mar. 6, 2014, the disclosure of which is incorporated herein in its entirety by reference.

BACKGROUND OF THE INVENTION

1. Field of the Invention

The present invention relates to a substrate laminating apparatus and a substrate laminating method used for laminating an optical substrate to a display device, for example, and to a stereoscopic display device.

2. Description of the Related Art

In accordance with the recent needs for sophisticated functions of display devices, there has been used a peculiar display device capable of providing stereoscopic image display and the like in which an optical substrate such as a lenticular lens substrate, a parallax barrier substrate, or a liquid crystal lens substrate is combined with a display panel that uses an electro-optical element such as a liquid crystal or an organic EL (electroluminescence).

As an example of such display device, a display device using a lenticular lens substrate will be described. FIG. 19A is a schematic perspective view of the lenticular lens substrate, and FIG. 19B is a schematic chart showing a structural example of the display device using the lenticular lens substrate and a stereoscopic display method.

As shown in FIG. 19A, one of the surfaces of the lenticular lens substrate 50 is constituted with a plane face and the other surface is constituted with cylindrical lenses 51. The cylindrical lens 51 has a cylindrical surface and a semicircular sectional shape, and a plurality of the cylindrical lenses are continuously provided in an extended manner in an x-direction and a parallel direction.

As shown in FIG. 19B, a left-eye pixel 65a and a right-eye pixel 65b are alternately disposed on a display panel 64 by corresponding to the focal points of each of the cylindrical lenses 51. When the left-eye pixels 65a and the right-eye pixels 65b are driven according to prescribed signals by a driving circuit, not shown, a left-eye image is formed in a left-eye region 70a and a right-eye image is formed in a right-eye region 70b, respectively, by the cylindrical lenses 51. This makes it possible for an observer to recognize a stereoscopic image. Needless to mention, it is also possible to display normal two-dimensional images by driving the left-eye pixels 65a and the right-eye pixels 65b with a same signal.

Further, as a display device using a lenticular lens substrate, there is a plural-image simultaneous display device which simultaneously displays a plurality of images. Through distributing different images for observing directions by the cylindrical lenses with the same method for achieving stereoscopic display described above, this display device becomes capable of simultaneously displaying images different from each other for a plurality of observes.

With such display device using the lenticular lens substrate, it is required to mount the lenticular lens substrate on the display panel with high precision in order to achieve high-quality stereoscopic display or plural-image simultaneous display. Particularly, for high-definition display devices loaded on recent terminal devices, it is required to achieve lamination with high precision in the order of μm which has not been required conventionally.

In order to achieve the lamination precision in the order of μm, it is necessary to form a mark of the optical substrate and a mark of the display panel in the order of μm, respectively. However, in general, it is difficult to form the marks with the precision of μm at the time of manufacturing the optical substrates by machining.

As an example of a lens mark forming and mark reading method for overcoming such issue, the method depicted in Japanese Unexamined Patent Publication 2012-013933 (Patent Document 1) will be shown (FIG. 20). As a mark for reading out the positional information of the lenticular lens substrate 50, at least one non-periodical flat part 54 with which the period of the cylindrical lenses changes is provided at an end part in a lens pitch direction as shown in FIG. 20A. FIG. 20B is an example of an image acquired by irradiating light to a contact part between the lenticular lens substrate 50 and a substrate head 58 and capturing the reflection light thereof. If a specific positional relation such as the non-periodical flat part 54 is clear, it is possible to read the pitch of a specific position on the lenticular lens substrate 50. In this manner, the positional information of the lens is read out from the luminance distribution of the reflection light, the panel mark of the display panel is captured via an another camera, and the positions are aligned in the manner of indirect alignment. In the meantime, in a case of direct alignment with which the panel mark of the display panel is read out via the lenticular lens substrate, the position of the panel mark is observed by being changed by the refraction effect generated by the lenticular lens. Thus, in regards to securing the precision, the indirect alignment is more useful than the direct alignment.

Further, in a case where the display panel and the optical substrate are constituted with highly rigid materials, air bubbles tend to be mixed at the time of lamination since rigid bodies are to be laminated. For preventing the mixture of air babbles, it is known to laminate the both under a reduced pressure that is lower compared to an atmospheric pressure as depicted in Japanese Unexamined Patent Publication 2012-133098 (Patent Document 2). As the lamination materials, an adhesive film called OCA (Optically Clear Adhesive) and an adhesive called OCR (Optical Clear Resin) are used in general.

In order to achieve the highly precise lamination with such reduced-pressure laminating apparatus, first of all, used is a vacuum chamber having high rigidity in which a door valve for moving in and out the display panel and the optical substrate and other part than the opening part called a gate valve are formed as a unified structure. Secondly, mechanism components having a driving system such as highly precise XYZ-axis guide and a linear scale are used in a camera that is used for measuring the positions of an upper table and a lower table and for measuring the positions of the display panel and the optical substrate.

Now, the outline of highly precise lamination done by the reduced-pressure laminating apparatus of the related technique will be described based on paragraphs 0012 to 0014 and the flowchart of FIG. 4 shown in Patent Document 2. In a vacuum chamber, an upper table and a lower table are disposed in parallel to be facing with each other vertically with a space provided therebetween. The door valve of the vacuum chamber is opened, a display panel and an optical substrate are inserted inside the vacuum chamber, either one (upper substrate) of the display panel and the optical substrate is held to the upper table by having its lamination surface facing downwards, and the other one (lower substrate) is held on the lower table by having its lamination surface facing upwards. When the upper and lower substrates are completely placed inside, the door valve is closed, and the inside of the vacuum chamber is evacuated. Further, in a state where the upper and lower tables are facing each other vertically with a space provided therebetween, alignment marks provided, respectively, on the optical substrate and the display panel, are read out by a plurality of position measurement cameras, and positions of the upper substrate and the lower substrate are aligned by a horizontal-direction (XYθ direction) movable mechanism that is provided on the lower table. Subsequently, the upper table is brought down by a driving motor, and the upper and lower substrates are laminated. The laminated substrates are sent out from the vacuum chamber by a transport mechanism through opening the gate valve of the vacuum chamber.

There is no specific technique shown in Patent Document 2 as a technique for reading out the alignment marks provided on the optical substrate and the display panel, respectively, by using the position measurement camera. However, for example, there are a technique (FIG. 4 of JP 4330912 B (Patent Document 3)) with which a camera is disposed on the outer side (atmospheric pressure side) of a vacuum chamber and alignment marks of the upper substrate and the lower substrate inside the vacuum chamber are captured through a window that is opened through the vacuum chamber and a technique (JP 4192181 B (Patent Document 4)) with which a vacuum-resistant camera is provided inside the vacuum chamber, and alignment marks are captured under a vacuum environment.

Further, devices for performing lamination by using an upper and lower vacuum chambers and manufacturing methods thereof are depicted in Japanese Unexamined Patent Publication 2008-286886 (Patent Document 6), Japanese Unexamined Patent Publication 2010-020068 (Patent Document 7), and Japanese Unexamined Patent Publication 2009-258582 (Patent Document 8).

However, in a case where lens lamination is performed by using the methods of the related techniques described above, there are following issues to be raised.

Patent Document 2 discloses a reduced-pressure laminating apparatus which has a vacuum chamber and laminates a display panel and an optical substrate under a reduced pressure. For performing such lamination of an optical sheet constituted with a lenticular lens substrate and a panel substrate, following structures cam be considered when the mark reading method (indirect alignment) shown in Patent Document 1 is employed.

The optical sheet is held on the upper table by having its lamination surface facing downwards, and the panel substrate is held on the lower table by having its lamination surface facing upwards. After evacuating inside the vacuum chamber, a position measurement camera is disposed under an alignment mark of the optical sheet through inserting the position measurement camera into a gap between the upper table and the lower table disposed in parallel with a space provided therebetween. Further, light is irradiated to a contact part between the upper substrate and the upper table, and the reflection light from the alignment mark is captured and read out. Then, the alignment mark of the display panel is read out, and the positions of the upper substrate and the lower substrate are aligned by a horizontal-direction (XYθ direction) movable mechanism that is provided on the lower table. Finally, the upper table is brought down by a driving motor, and the upper and lower substrates are laminated tightly.

The point of this structure is to use the vacuum-resistant camera shown in Patent Document 4 as the position measurement camera, to insert the position measurement camera into the space between the upper and lower tables, and to capture and read out the reflection light of the alignment mark. However, there are following issues with the mechanism constituted with such structure.

The camera that can bear the vacuum environment shown in Patent Document 4 used as the position measurement camera requires special exterior members as well as wirings such as a camera casing formed with stainless steel, a connector, and a jacket that covers the connector. Thus, such camera is a more complicated structure than a regular camera used in an atmospheric pressure, so that it is expensive. Therefore, the cost is increased further when a plurality of those cameras are to be used.

Further, because of the structure with which the position measurement camera is inserted into the space between the upper and lower tables, it is necessary to add a highly precise XY transport mechanism within the vacuum chamber for moving the position measurement camera in the horizontal direction (XY). It is more difficult for the transport mechanism used in vacuum to radiate the heat compared to the transport mechanism used in an atmospheric pressure, so that the cost for securing the heat radiation performance and the heat resistance performance is more increased.

Further, the moving stroke of the camera transport mechanism is greater at least than the plane size of the upper table. It is because the camera needs to be evacuated from the upper table so that the camera does not become an obstruction when the upper table moves up and down in a laminating action. Thereby, the transport mechanism whose plane size is larger than that of the upper table is structured in the periphery of the upper table. Thus, the vacuum chamber that houses the transport mechanism becomes considerably larger than the case of Patent Document 2 described above. The increase in the size of the vacuum chamber leads to the increase in the size and weight of the entire laminating apparatus. Thus, it is required to increase the size of the device frame and to take a measure for increasing the rigidity, so that not only the cost but also the installment space is increased.

As a measure thereof, there is considered following Improvement Plan 1. This is a plan which uses the camera generally used in an atmospheric pressure as the position measurement camera and employs the transport mechanism that moves the position measurement camera in an atmospheric pressure as shown in FIG. 20 and FIG. 21 of WO 2010/026768 (Patent Document 5). This Improvement Plan 1 will be described in the followings.

Inside the vacuum chamber, the upper table and the lower table are disposed in parallel by facing with each other vertically with a space provided therebetween. By the side of the vacuum chamber, provided is a camera transport mechanism constituted with a scalar-type robot, an XY parallel-direction direct robot, or the like in which a plurality of position measurement cameras are provided in the tip end of an arm-type supporting body. The door valve of the vacuum chamber is opened, a display panel and an optical substrate are inserted inside the vacuum chamber, the optical substrate is held on the upper table by having its lamination surface facing downwards, and the panel substrate is held on the lower table by having its lamination surface facing upwards. When the upper and lower substrates are completely placed inside, the camera transport mechanism is inserted from the opening part of the door valve in a state where the upper and lower tables are placed to face with each other with a space therebetween, and the position measurement camera is disposed under the alignment mark of the optical substrate. Further, light is irradiated to the contact part between the upper substrate and the upper table, and the reflection light from the alignment mark is captured and read out. Then, the alignment mark of the display panel is read out. When reading of the alignment marks is completed, the camera transport mechanism is drawn out from the opening part of the door valve, and the position measurement camera is taken out to the side of the vacuum chamber. Subsequently, the door valve is closed, and the inside of the vacuum chamber is evacuated. Then the positions of the upper substrate and the lower substrate are aligned by a horizontal-direction (XYθ direction) movable mechanism that is provided on the lower table. After the position alignment, the upper table is brought down by a driving motor, and the upper and lower substrates are laminated. The laminated substrates are sent out from the vacuum chamber by a transport mechanism through opening the gate valve of the vacuum chamber.

The point of Improvement Plan 1 is to provide the camera transport mechanism constituted with a scalar-type robot, an XY parallel-direction direct robot, or the like in which a plurality of position measurement cameras are provided in the tip end of an arm-type supporting body by the side of the vacuum chamber and to read out alignment marks in an atmospheric pressure. Thereby, it becomes unnecessary to employ the above-described vacuum-resistant camera and the transport mechanism used in vacuum, so that a certain effect can be expected to address the increase in the cost and expansion in the installment space regarding those.

However, with Improvement Plan 1, it is difficult to have the lamination precision within the order of μm. That is, the arm-type supporting body having the position measurement cameras in the tip end thereof is formed in a cantilever structure having its fulcrum on the outside of the vacuum chamber. Therefore, position shift and defocusing are generated in the position measurement camera by the oscillation of the surroundings transmitted to the camera transport mechanism, so that the alignment precision is deteriorated.

Based on the above, the reduced-pressure laminating apparatus shown in Patent Document 2 still faces issues in regards to the increase in the cost, expansion in the installment space, deterioration in the lamination precision, and the like, for laminating the optical sheet constituted with the lenticular lens substrate and the display panel substrate.

In the meantime, Patent Document 1 discloses a lens mark forming and mark reading method for an optical sheet constituted with a lenticular lens substrate as well as a laminating method of an optical sheet and a display panel. As shown in paragraph 0054, FIG. 1C, and FIG. 8B of Patent Document 1, the optical sheet and display panel laminating method is to laminate the optical sheet constituted with the lenticular lens to the display panel by tilting the sheet holding head with respect to the display panel. However, as the lamination started from the end part proceeds, the contact angle between the sheet holding head and the display panel becomes smaller gradually. Thus, there is a risk of having air bubbles inserted immediately before completion of the lamination, and it is expected that the rate of having the air bubbles inserted therein becomes greater as the optical sheet becomes larger.

Further, also disclosed in Paragraphs 0061 to 0063 and FIG. 1 of Patent Document 1 is a method which laminates the optical sheet to the display panel continuously from the end part of the optical sheet towards the end part on the opposite side by having the held optical sheet to be in contact with the display panel by using a sheet holding head having an arc-shape holding face and rotating the rotation shaft of the sheet holding head while relatively moving the display panel or the rotation shaft itself to synchronize with the rotation. With this method, the contact angle between the optical sheet and the display panel becomes always constant from the start of lamination to the end. Thus, it is expected that there is no risk of having air bubbles inserted immediately before completing the lamination as mentioned above. However, while a film-sheet type optical sheet formed with a material that can be bent smoothly without hindrance can be held to the arc-shape holding face, it is difficult to hold the optical sheet formed with a highly rigid material. For example, it is difficult with this method to laminate an optical sheet constituted with a lenticular lens substrate having a transparent plate such as glass as a base member.

Thus, there is considered following Improvement Plan 2 in which a vacuum chamber and a vacuum evacuation system are added to the sheet holding head and the panel stage shown in a first exemplary embodiment of Patent Document 1, and lamination is performed in a reduced pressure that is lower than an atmospheric pressure.

Specifically, the vacuum chamber is formed as a divided structure constituted with a pair of vertically divided cubic vacuum chambers, the sheet holding head is disposed inside of the upper chamber (upper vacuum chamber) that is one of the vacuum chambers, the panel stage is disposed inside the lower chamber (lower vacuum chamber) that is the other vacuum chamber, and a vacuum evacuation system is provided on the side face of the lower vacuum chamber. Further, as the lamination steps, a step of forming a closed space as a vacuum chamber by a contact between the upper vacuum chamber and the lower vacuum chamber when bringing the sheet holding head and the panel stage to become close vertically and then reducing the pressure inside the vacuum chamber (surroundings of the sheet holding head and the panel stage) by evacuation before performing lamination is added to the step of laminating the optical sheet to the display panel (see step 106 of paragraph 0033 of Patent Document 1).

With this Improvement Plan 2, it is expected to become capable of laminating the above-described optical sheet constituted with a lenticular lens substrate having a transparent plate member as a base material. Further, the inner size of the added vacuum chamber simply needs to be slightly larger than the plane size of the sheet holding head and the panel stage. Thus, it is estimated that expansion of the installment space by employing Improvement Plan 2 is relatively small.

However, the vacuum chamber added in Improvement Plan 2 is formed in a divided structure being divided into two vertically. Thus, compared to a unified-structure vacuum structure, there is such an issue in terms of the structure that the rigidity of the parts divided into two vertically is deteriorated. That is, through providing a piping apparatus of the vacuum evacuation system on the side face of the lower vacuum chamber, the compression force by the atmospheric pressure at the time of reducing the pressure works as a shear force on the side face (horizontal direction) of the lower vacuum chamber. This causes deformation of the lower vacuum chamber. The deformation of the lower vacuum chamber causes position shift of the panel stage. Further, the shear force deteriorates the alignment precision of the horizontal transport mechanism of the panel stage. Particularly, when the vacuum evacuation direction is roughly consistent with the direction along which the lamination precision is required, the lamination precision is deteriorated by vacuum evacuation before and after a curing process of an adhesive such as OCR, for example.

Further, in a case of indirect alignment shown in Patent Document 1, it is necessary to individually capture the images of each of the marks of the optical substrate and the display panel. For example, in a case where the imaging camera exists at a fixed position when capturing the image of the optical substrate as shown in FIG. 20B of the current Specification, it is necessary to provide a step of capturing the image while moving the optical substrate and to provide a highly precise transport mechanism in order to capture marks at a plurality of points within the optical substrate. This leads to the increase in the size of the device frame due to the added transport mechanism, so that not only the cost but also the installment space is increased.

Further, regarding the transport mechanisms, there necessarily exits shift (error) in the position called alignment precision in each of the mechanisms. It means that the position shift (error) of the transport mechanism is accumulated as the number of the transport mechanisms associated with the lamination precision is increased so that the lamination precision becomes deteriorated gradually. The laminating apparatus requires lamination precision in the order of µm. Therefore, it is desired to achieve the device structure having the reduced number of transport mechanisms as much as possible in order to implement and maintain the precision.

In Patent Documents 6, 7, and 8, shown is a structure using a direct alignment method, which includes a means for capturing images of marks on the substrate in a state where an optical substrate and a display panel are placed in parallel by facing with each other with a space provided therebetween. With this method, when the optical substrate is employed as the substrate as described above, the position of the panel mark is observed by being changed by a refraction effect of the optical elements (lenticular lenses, for example) on the optical substrate. Thus, this method is inferior to indirect alignment in regards to securing the precision.

Further, with the techniques disclosed in Patent Documents 3, 6, 7 and the second exemplary embodiment of Patent Document 8, it is required to provide a window of light-transparent glass opened through a vacuum chamber in accordance with the mark capturing position. Thus, when changing the panel size, it is necessary to add the light-transparent window and modify the size of the window so that the cost is increased. In the first exemplary embodiment of Patent Document 8, disclosed is a structure with which no light-transparent glass is provided in a vacuum chamber while providing a camera inside the vacuum chamber. However, as described in Patent Document 4, the camera that can bear the vacuum environment is expensive. Further, the third exemplary embodiment of Patent Document 8 shows a structure with which lamination is performed under the vacuum environment. However, when an adhesive film called OCA is used as a lamination material, there is a risk of having air bubbles inserted between the optical substrate and the display panel as described above.

Further, in the technique disclosed in Patent Document 7, the lens pitch direction and the vacuum evacuation direction are the same as shown in FIG. 4 thereof. However, the lens pitch direction is the direction along which the lamination precision is required. Therefore, with this technique, the lamination precision is deteriorated by the vacuum evacuation as described above.

It is therefore an exemplary object of the present invention to provide a substrate laminating apparatus and a substrate laminating method capable of making it possible to perform lamination with high precision when laminating two substrates while saving the cost and space, and to provide a stereoscopic image display device of high image quality, which is manufactured by using the substrate laminating apparatus and the substrate laminating method.

SUMMARY OF THE INVENTION

The substrate laminating apparatus according to the present invention includes: a first vacuum chamber including a first opening; a first table provided inside the first opening of the first vacuum chamber for holding a first substrate, a second vacuum chamber including a second opening; a second table provided inside the second opening of the second vacuum chamber for holding a second substrate; a moving mechanism unit which moves the first vacuum chamber so that the first opening faces against the second opening to be able to form a closed space; an image capturing unit provided on an outer side of the first opening of the first vacuum chamber to acquire positional information of the second substrate by being moved along with the first vacuum chamber by the moving mechanism unit and capturing an image of the second substrate that is held to the second table; and a control unit which laminates the first substrate held to the first table to the second substrate based on the positional information of the second substrate acquired by the image capturing unit.

The substrate laminating method according to the present invention is used with the substrate laminating apparatus which includes: a first vacuum chamber including a first opening; a first table provided inside the first opening of the first vacuum chamber for holding a first substrate; a second vacuum chamber including a second opening; a second table provided inside the second opening of the second vacuum chamber for holding a second substrate; a moving mechanism unit which moves the first vacuum chamber so that the first opening faces against the second opening to be able to form a closed space; an image capturing unit provided on an outer side of the first opening of the first vacuum chamber, the method including: moving the image capturing unit along with the first vacuum chamber by the moving mechanism unit; acquiring positional information of the second substrate held to the second table through capturing an image of the second substrate that is held to the second table by using the image capturing unit; and laminating the first substrate held to the first table to the second substrate based on the positional information of the second substrate acquired thereby.

The stereoscopic image display device according to the present invention is manufactured by using the substrate laminating method according to the present invention.

BRIEF DESCRIPTION OF THE DRAWINGS

FIGS. 1A and 1B show a substrate laminating apparatus according to a first exemplary embodiment, in which FIG. 1A is a top view and FIG. 1B is side elevational view;

FIG. 2 is a flowchart showing actions of the substrate laminating apparatus shown in FIGS. 1A and 1B;

FIGS. 3A and 3B show side elevational views of the substrate laminating apparatus shown in FIGS. 1A and 1B, in which FIG. 3A shows the action of STEP 1 shown in FIG. 2 and FIG. 3B shows the action of STEPS 2 to 4 shown in FIG. 2;

FIGS. 4A and 4B show side elevational views of the substrate laminating apparatus shown in FIGS. 1A and 1B, in which FIG. 4A shows the action of STEPS 5 to 6 shown in FIG. 2 and FIG. 4B shows the action of STEP 7 shown in FIG. 2;

FIGS. 5A and 5B show side elevational views of the substrate laminating apparatus shown in FIGS. 1A and 1B, in which FIG. 5A shows the action of STEP 8 shown in FIG. 2 and FIG. 5B shows the action of STEP 9 shown in FIG. 2;

FIGS. 6A and 6B show side elevational views of the substrate laminating apparatus shown in FIGS. 1A and 1B, in which FIG. 6A shows the action of STEP 10 shown in FIG. 2 and FIG. 6B shows the action of STEP 11 shown in FIG. 2;

FIGS. 7A and 7B shows side elevational views of the substrate laminating apparatus shown in FIGS. 1A and 1B, in which FIG. 7A shows the action of STEP 12 shown in FIG. 2 and FIG. 7B shows the action of STEP 13 shown in FIG. 2;

FIGS. 8A and 8B shows side elevational views of the substrate laminating apparatus shown in FIGS. 1A and 1B, in which FIG. 8A shows the action of STEP 14 shown in FIG. 2 and FIG. 8B shows the action of STEP 15 shown in FIG. 2;

FIGS. 9A and 9B shows side elevational views of the substrate laminating apparatus shown in FIGS. 1A and 1B, in which FIG. 9A shows the action of STEP 16 shown in FIG. 2 and FIG. 9B is a block diagram showing a control system of the substrate laminating apparatus shown in FIGS. 1A and 1B;

FIG. 10 is a table showing a list of comparisons made between main structural devices of a modification example and the structure of the first exemplary embodiment;

FIGS. 11A and 11B show a substrate laminating apparatus according to a second exemplary embodiment, in which FIG. 11A is a top view and FIG. 11B is side elevational view;

FIGS. 12A and 12B show side elevational views of the substrate laminating apparatus shown in FIG. 11, in which FIG. 12A shows the action of step 10 shown in FIG. 2 and FIG. 12B shows the action of step 11 shown in FIG. 2;

FIGS. 13A and 13B show side elevational views of the substrate laminating apparatus shown in FIG. 11, in which FIG. 13A shows the action of STEP 12 shown in FIG. 2 and FIG. 13B shows the action of STEP 13 shown in FIG. 2;

DETAILED DESCRIPTION OF THE PREFERRED EMBODIMENTS

Figure 9A:
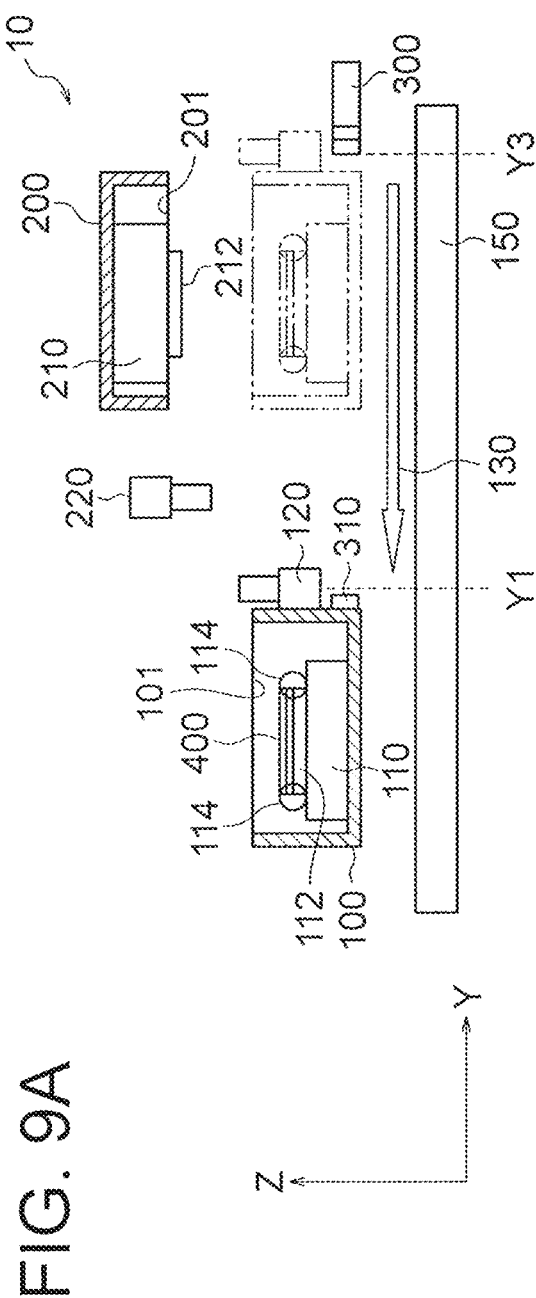

Hereinafter, modes (referred to as "exemplary embodiments" hereinafter) for embodying the present invention will be described by referring to the accompanying drawings. Note that same reference numerals are used for substantially same structural elements in the current Specification and the drawings. The shapes in the drawings are illustrated in a manner to be easily comprehended by those skilled in the art, so that sizes and ratios thereof are not necessarily consistent with the actual ones.

The structural elements in this Specification are examples of the structural elements within the scope of the appended claims, and the corresponding relationships between those are as follows. A lenticular lens substrate 50 is an example of an "optical substrate", a lower vacuum chamber 100 is a "first vacuum chamber", a lower surface plate XYθ slight moving mechanism 110 is an "precision securing mechanism", a lower table 112 is a "first table", a lower substrate 113 is a "first substrate", an upper substrate camera group 120 is an "image capturing unit or first image capturing unit", a Y-axis servo mechanism 130 is a "moving mechanism unit", an upper vacuum chamber 200 is a "second vacuum chamber", an upper table 212 is a "second table", an upper substrate 213 is a "second substrate", a lower substrate camera group 220 is a "second image capturing unit", a vacuum evacuation attaching/detaching mechanism 300 and a vacuum evacuation port 310 are a "vacuum evacuation unit", respectively.

First Exemplary Embodiment

FIGS. 1A and 1B show an example of the structure of a substrate laminating apparatus 10 of a first exemplary embodiment. FIG. 1A is a top view when an XY plane is viewed from the Z-axis direction, and FIG. 1B is a side elevational view when a YZ plane is viewed from the X-axis direction.

The outline of the substrate laminating apparatus according to the first exemplary embodiment will be described. The substrate laminating apparatus (10) includes: a first vacuum chamber (100) having a first opening (101); a first table (112) for holding a first substrate (113) by being provided inside the first opening (101) of the first vacuum chamber (100); a second vacuum chamber (200) having a second opening (201); a second table (212) for holding a second substrate (213) by being provided inside the second opening (201) of the second vacuum chamber (200); a moving mechanism unit (130) which moves the first chamber (100) to be able to form a closed space (600, FIG. 6A and the like) by having the first opening (101) facing with the second opening (201); an image capturing unit (120) that moves along with the first vacuum chamber (100) by the moving mechanism unit (130) by being provided to the outer side of the first opening (101) of the first vacuum chamber (100), and captures the image of the second substrate (213) held to the second table (212) to acquire the positional information of the second substrate (201); and a control unit (700, FIG. 9B) which laminates the first substrate (113) held to the first table (112) and the second substrate (213) based on the positional information of the second substrate (213) acquired by the image capturing unit (120).

The outline of a substrate laminating method of the first exemplary embodiment will be described. The substrate laminating method of the first exemplary embodiment uses the substrate laminating apparatus (10) which includes: the first vacuum chamber (100) having the first opening (101); the first table (112) for holding the first substrate (113) by being provided inside the first opening (101) of the first vacuum chamber (100); the second vacuum chamber (200) having the second opening (201); the second table (212) for holding the second substrate (213) by being provided inside the second opening (201) of the second vacuum chamber (200); the moving mechanism unit (130) which moves the first vacuum chamber (100) to be able to form the closed space (600, FIG. 6A and the like) by having the first opening (101) facing with the second opening (201); and the image capturing unit (120) provided to the outer side of the first opening (101) of the first vacuum chamber (100), in which: the image capturing unit (120) is moved along with the first vacuum chamber (100) by the moving mechanism unit (130); the positional information of the second substrate (213) held by the second table (212) is captured by the capturing an image of the second substrate (213) held to the second table (212) by using the image capturing unit (120); and the first substrate (113) held to the first table (112) is laminated to the second substrate (213) based on the acquired positional information of the second substrate (213).

Hereinafter, details of the substrate laminating apparatus and the substrate laminating method of the first exemplary embodiment will be described.

The lower vacuum chamber 100 and the upper vacuum chamber 200 are disposed along the Y-axis direction, and those chambers are also disposed in such a manner that the Z-value of the upper vacuum chamber 200 becomes larger than the Z-value of the lower vacuum chamber 100. The lower vacuum chamber 100 is connected to the Y-axis servo mechanism 130, and the upper vacuum chamber 200 is connected to the Z-axis servo mechanism 230. As the Y-axis servo mechanism 130, it is possible to use a highly precise transport mechanism constituted with a highly precise ball screw, a highly precise guide rail, a servo motor, and a highly precise measurement device such as a linear scale. It is desirable to select the device whose alignment precision is within a range of several μm.

The lower vacuum chamber 100 can be moved only in the Y-axis direction, and the upper vacuum chamber 200 can be moved only in the Z-axis direction. That is, the lower vacuum chamber 100 and the upper vacuum chamber 200 are formed as a uniaxially moving structure that does not require the move towards the X-axis direction. Further, all of the apparatuses including the above-described apparatuses and the apparatuses to be described later are built on a platform 150.

The lower surface plate XYθ slight moving mechanism 110 as the precision securing mechanism is disposed inside the lower vacuum chamber 100, and the lower table 112 is disposed thereon. The lower table 112 includes a substrate fixing mechanism for fixing the lower substrate 113 by adsorption or adhesion. A display panel can be used as the lower substrate 113.

Further, as shown in FIG. 1A as an example, it is also possible to provide an UV irradiation mechanism 114 as necessary. The UV irradiation mechanism 114 is provided at least at two points on the side of the lower surface plate XYθ slight moving mechanism 110, and horizontally irradiates UV light to the side face of the lower table 112. Spaces between each of the UV irradiation mechanisms 114 can be adjusted and fixed.

The upper-substrate camera group 120 is provided on the outer side (the surface that is always under an atmospheric pressure) of the lower vacuum chamber 100. The upper-substrate camera group 120 is constituted with two cameras of a left upper-substrate camera 120a and a right upper-substrate camera 120b. The left upper-substrate camera 120a and the right upper-substrate camera 120b are held by left and right moving mechanisms (not shown) provided on the side face of the lower vacuum chamber 100, respectively, and can slightly move in the X-axis direction. The direction along which the images are captured by the left upper-substrate camera 120a and the right upper-substrate camera 120b is the direction where the value of the Z-axis becomes larger, and it is the outer side of the lower vacuum chamber 100.

In other words, the structure described above can be described as follows. The first vacuum chamber (100) includes the moving mechanism unit (130) for forming the closed space (600, FIG. 6A and the like) between with the second vacuum chamber (200). The first vacuum chamber (100) includes the first image capturing unit (120) for reading out the positional information of the second substrate (213) on the outer side where the closed space (600, FIG. 6A) of the first vacuum chamber (100) is not formed. The first image capturing unit (120) has a function which captures an image of the mark on the second substrate (213) at a position where the closed space (600, FIG. 6A) of the first vacuum chamber (100) is not formed, and extracts the positional information from the captured image.

At a contact part between the upper vacuum chamber 200 and the lower vacuum chamber 100, it is desirable to provide an O-ring type seal made with rubber or resin in order to secure the airtightness after the both chambers come in contact. An upper surface plate pressing mechanism 210 is disposed inside the upper vacuum chamber 200, and the upper table 212 is disposed thereon. The upper table 212 includes a substrate fixing mechanism which fixes the upper substrate 213 by adsorption or adhesion. As the upper substrate 213, it is possible to use an optical substrate such as a lenticular lens substrate.

The substrate laminating apparatus 10 further includes a lower-substrate camera group 220, a vacuum evacuation attaching/detaching mechanism 300, a vacuum evacuation pump (not shown), and the like.

The lower-substrate camera group 220 is disposed at position Y2, and it is constituted with two cameras of a left lower-substrate camera 220a and a right lower-substrate camera 220b.

The left lower-substrate camera 220a and the right lower-substrate camera 220b are held by left and right moving mechanisms (not shown), respectively. The direction along which the images are captured by the left upper-substrate camera 220a and the right upper-substrate camera 220b is the direction where the value of the Z-axis becomes smaller.

The vacuum evacuation attaching/detaching mechanism 300 is formed as a structure which is connected to the vacuum evacuation pump (not shown), includes a horizontal moving mechanism such as an air cylinder, and is detachable from the vacuum evacuation port 310 provided in the side face of the lower vacuum chamber 100. The vacuum evacuation port 310 has a flange port with an O-ring, for example, in order to secure the airtightness at the time of mounting the vacuum evacuation attaching/detaching mechanism 300. The vacuum evacuation attaching/detaching mechanism 300 has a flange port in a same size as that of the flange port of the vacuum evacuation port 310. Through horizontally pressing the vacuum evacuation attaching/detaching mechanism 300 against the vacuum evacuation port 310 by an air cylinder, the airtightness is secured by deformation of the O-ring to be fitted tightly.

Regarding a case of using a lenticular lens substrate as the upper substrate 213 and a display panel as the lower substrate 113, proper layout of the upper substrate 213 and the lower substrate 113 will be described by referring to FIG. 19A and FIG. 19B.

Figure 19A:
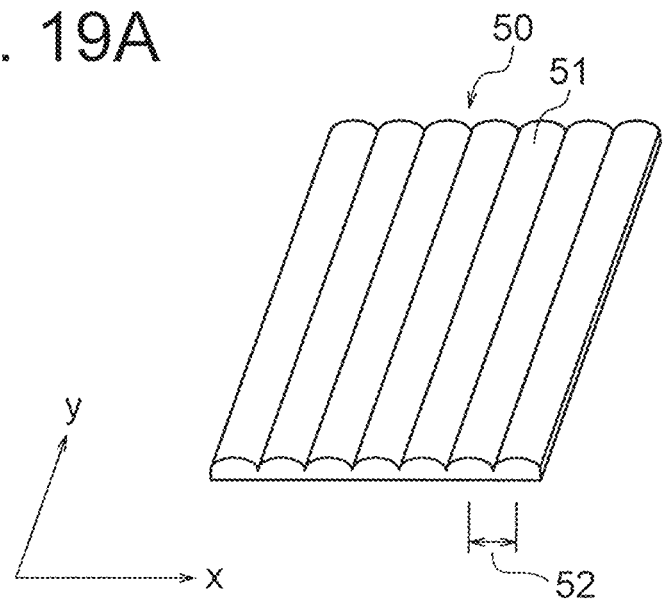
FIG. 19A is a schematic perspective view showing a lenticular lens substrate.
Figure 19B:
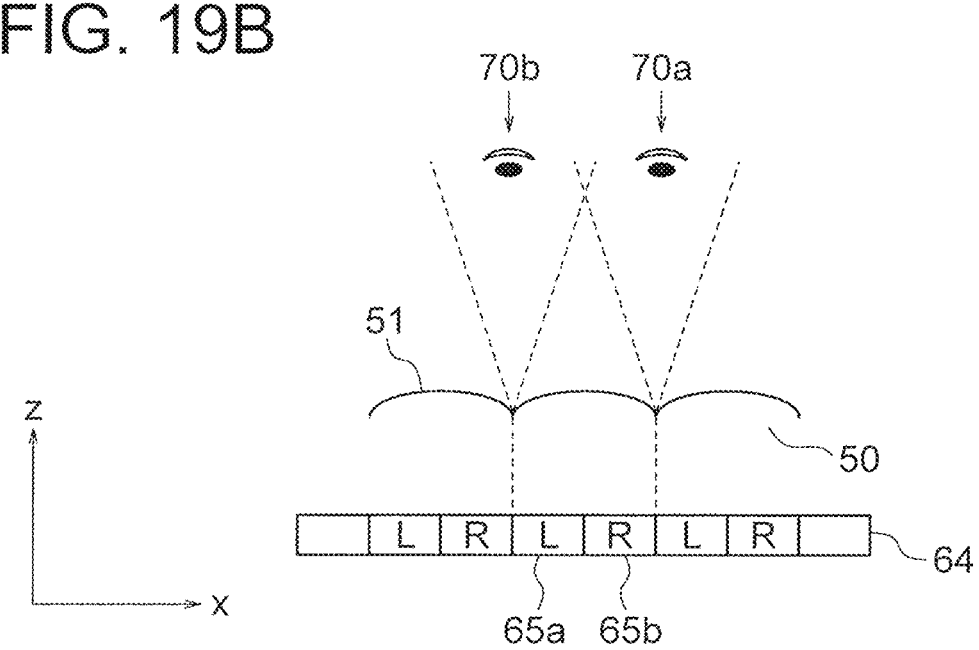
FIG. 19B is a schematic chart showing a structural example of a display device using the lenticular substrate and a stereoscopic display method.
Figure 20A:
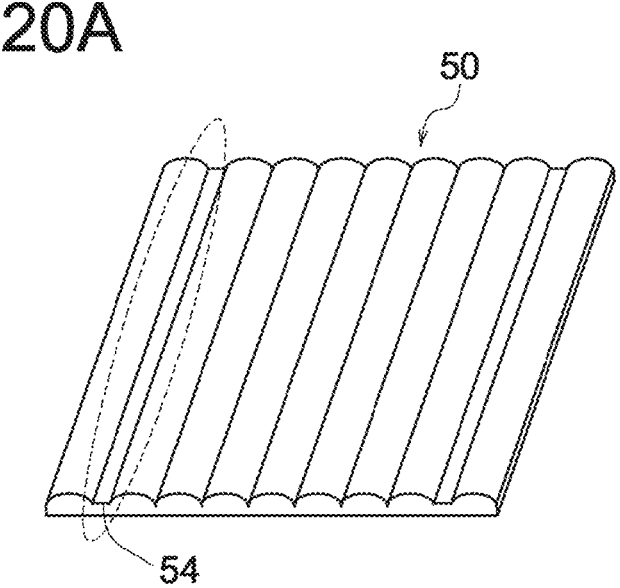
FIG. 20A is a perspective view showing a non-periodical part that is a lens mark.
Figure 20B:
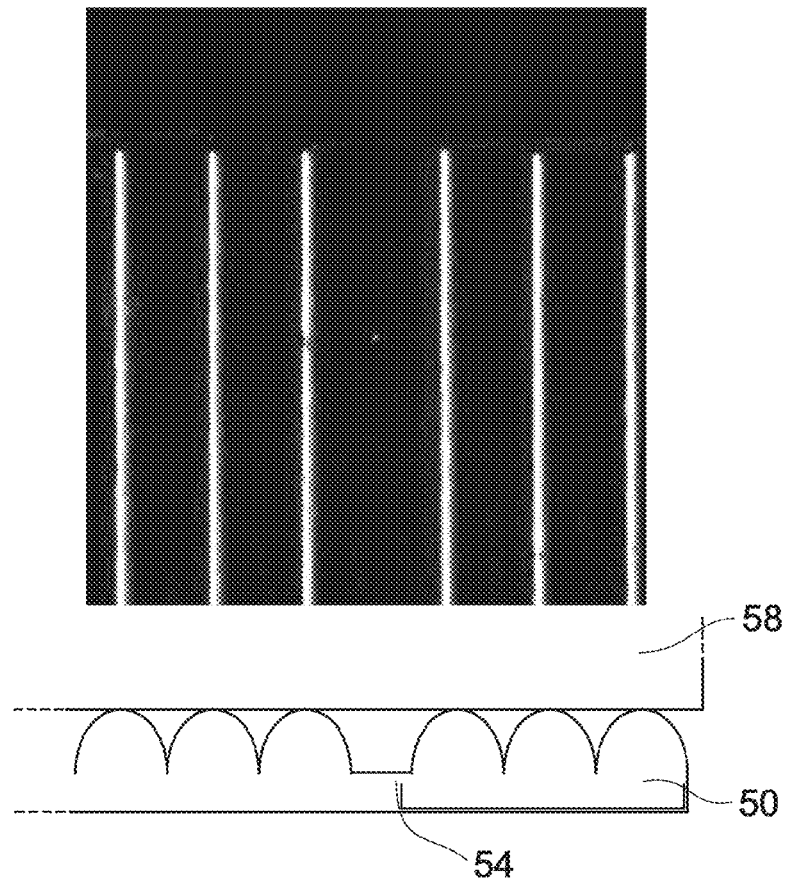
FIG. 20B is an explanatory chart showing a lens mark reading method.

In FIG. 19A, the layout direction of the cylindrical lenses 51, i.e., the direction of the lens pitch 52, is defined as the x-direction. As shown in FIG. 19B, left-eye pixels 65a and right-eye pixels 65b are alternately disposed in the x-direction on a display panel 64 by corresponding to the focal points of each of the cylindrical lenses 51. This means that each of the cylindrical lenses 51 and each of the pixels (the left-eye pixels 65a and the right-eye pixels 65b) are perfectly aligned in the x-direction. In order to allow an observer to recognize a prescribed stereoscopic image, the lamination precision in the x-direction is extremely important. In the meantime, the lamination precision is not required to be so precise in the y-direction shown in FIG. 19A as much as it is requested in the x-direction. This is because the cylindrical lens 51 has a function of distributing the light in one direction (x-direction), so that the precision in that direction becomes extremely important. The x-direction is defined as a "lamination precision priority direction".

This will be described by referring to the substrate laminating apparatus 10 shown in FIG. 1. The lower vacuum chamber 100 includes a highly precise transport mechanism (the Y-axis servo mechanism 130) only for the Y-axis as described above. In the highly precise transport mechanism, an error between the transport set value and the actually transported position, which is called alignment precision, exists within a range of several μm. However, in order to secure the high lamination precision, it is desired to suppress the influence of alignment precision as much as possible. Therefore, it is desirable to set the lenticular lens substrate 50 and the display panel 64 in such a manner that the lamination precision priority direction (the x-direction, i.e., the layout direction of the cylindrical lenses 51 shown in FIG. 19A and the direction along which the left-eye pixels 65a and the right-eye pixels 65b shown in FIG. 19B are disposed) becomes different from the Y-axis that is the moving direction of the highly precise transport mechanism. Further, it is more preferable that the lamination precision priority direction is in parallel to the X-axis that is orthogonal to the Y-axis. This is because the influence of the alignment precision on the Y-axis becomes the smallest with X-axis.

While the details will be described later, the outline of the actions of the substrate laminating apparatus 10 is as follows. The lower vacuum chamber 100 mounts the lower substrate 113 at a position Y1. The lower-substrate camera group 220 is disposed at a position Y2. The lower vacuum chamber 100 having the lower substrate 113 mounted thereon moves to the vicinity of the position Y2, and the lower-substrate camera group 220 captures an image of the mark of the lower substrate 113. Then, the lower surface plate XYθ slight-moving mechanism 110 operates according to the mark captured result, and the lower vacuum chamber 100 moves to a position Y3. Subsequently, the upper vacuum chamber 200 having the upper substrate 213 mounted thereon moves from a position Z1 towards a position Z2, and a closed space is formed by the upper vacuum chamber 200 and the lower vacuum chamber 100. Then, the vacuum evacuation attaching/detaching mechanism 300 moves to the Y-axis direction to connect to the lower vacuum chamber 100, and performs evacuation of the inside of the closed space. After completing the evacuation, the upper surface plate pressurizing mechanism 210 performs a prescribed pressure action, thereby completing lamination of the lower substrate 113 and the upper substrate 213. Note here that the positions Y1 and Y3 of the lower vacuum chamber 100 are the coordinate of the center of the camera viewing field of the upper-substrate camera group 120.

Figure 9B:
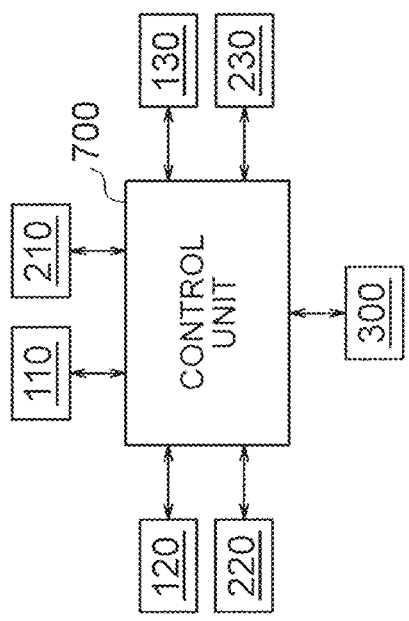

The control unit 700 shown in FIG. 9B is constituted with a computer and programs thereof, for example, and it is electrically connected to the lower surface plate XYθ slight moving mechanism 110, the upper-substrate camera group 120, the Y-axis servo mechanism 130, the upper surface plate pressurizing mechanism 210, the lower-substrate camera group 220, the Z-axis servo mechanism 230, the vacuum evacuation attaching/detaching mechanism (including a vacuum evacuation pump) 300, and the like. A part of or a whole part of the actions of the substrate laminating apparatus 10 can also be achieved by the program of the control unit 700. The program may be recorded on a non-transitory storage media such as an optical disk, a semiconductor memory, and the like. In such case, the program is read out from the storage medium by a computer and executed.

FIG. 2 shows the flowchart of the actions of the substrate laminating apparatus 10.

STEP 1 is a step for loading the upper substrate 213 on the lower table 112. As shown in FIG. 3A, the lower vacuum chamber 100 is at the position Y1 that is the substrate holding position, and an upper-substrate external positioning jig 115 is mounted on the lower table 112. Then, the upper substrate 213 is loaded on the lower table 112 while having side faces of the upper substrate 213 in the longitudinal direction and the lateral direction in contact with the upper-substrate external positioning jig 115. Subsequently, the upper substrate 213 is fixed to the lower table 112 by adsorption or adhesion by the substrate fixing mechanism.

STEP 2 is a step of moving the lower vacuum chamber 100 to the position Y3 that is a closed space forming position. As shown in FIG. 3B, the lower vacuum chamber 100 at the position Y1 is moved to the position Y3 by the Y-axis servo mechanism 130.

STEP 3 is a step of bringing down the upper vacuum chamber 200, and moving the upper substrate 213 on the upper table 212. As shown in FIG. 3B, the upper vacuum chamber 200 at the position Z1 and the position Y3 is brought down to the position Z2 by the Z-axis servo mechanism 230. The position Z2 is a position at which the surface of the upper table 212 comes in contact with the surface of the upper substrate 213. Thereby, the upper substrate 213 is fixed to the upper table 212 by adsorption or adhesion by the substrate fixing mechanism. Subsequently, the upper substrate 213 is separated from the lower table 112. At this time, when the substrate fixing mechanism of the lower table 112 is of an adsorption type, the upper substrate 213 is separated from the lower table 112 by an adsorption breaking action. Further, when the substrate fixing mechanism of the lower table 112 is of an adhesion type, the upper substrate 213 is separated from the lower table 112 by setting the adhesive force of the upper table 212 to be stronger than the adhesive force of the lower table 112.

STEP 4 is a step of bringing up the upper vacuum chamber 200. As shown in FIG. 3B, when the upper vacuum chamber 200 is brought up from the position Z2 to the position Z1 by the Z-axis servo mechanism 230, the upper substrate 213 is brought up while being held to the upper table 212.

STEP 5 is a step of moving the lower vacuum chamber 100 to the position Y1. As shown in FIG. 4A, the lower vacuum chamber 100 is moved from the position Y3 to the position Y1 by the Y-axis servo mechanism 130.

STEP 6 is a step of measuring the pitch of the alignment mark of the upper substrate 213 by the upper-substrate camera group 120 provided to the lower vacuum chamber 100 in the middle of STEP 5. As shown in FIG. 4A, the lower vacuum chamber 100 is moved horizontally from the position Y3 to the position Y4 by the Y-axis servo mechanism 130. At the position Y4, the center of a view field 121 of the upper-substrate camera group 120 provided to the lower vacuum chamber 100 becomes consistent with a first upper substrate alignment mark 213a of the upper substrate 213. After the upper-substrate camera group 120 stops at the position Y4, images of the left and right marks of the first upper substrate alignment mark 213a are captured by using the left upper-substrate camera 120a and the right upper-substrate camera 120b, and the position of the first upper-substrate alignment mark 213a is acquired by an image recognition device (e.g., the control unit 700 shown in FIG. 9B) which is connected to the upper-substrate camera group 120. Subsequently, the lower vacuum chamber 100 is horizontally moved from the position Y4 to the position Y5 by the Y-axis servo mechanism 130. As in the case of the position Y4, at the position Y5, the center of the view field 121 of the upper-substrate camera group 120 provided to the lower vacuum chamber 100 becomes consistent with a second upper-substrate alignment mark 213b of the upper substrate 213. After the upper-substrate camera group 120 stops at the position Y5, images of the left and right marks of the second upper-substrate alignment mark 213b are captured by using the left upper-substrate camera 120a and the right upper-substrate camera 120b, and the position of the second upper-substrate alignment mark 213b is acquired by an image recognition device (e.g., the control unit 700 shown in FIG. 9B) which is connected to the upper-substrate camera group 120.

As described, in STEP 6, the alignment action of the upper substrate 213 is performed by synchronizing with the move of STEP 5 in which the lower vacuum chamber 100 returns to the position Y1 from the position Y3. Thus, it is an efficient step with no redundancy.

STEP 7 is a step of loading the lower substrate 113 on the lower table 112. As shown in FIG. 4B, the upper substrate external positioning jig 115 is detached from the lower table 112, and a lower substrate external positioning jig 116 is mounted to the lower table 112. Then, lower substrate 113 is loaded on the lower table 112 while having side faces of the lower substrate 113 in the longitudinal direction and the lateral direction in contact with the lower-substrate external positioning jig 116. On the top face of the lower substrate 113, an adhesive film called OCA is laminated or an adhesive called OCR is applied (not shown). Subsequently, the lower substrate 113 is fixed to the lower table 112 by adsorption or adhesion by the substrate fixing mechanism.

STEP 8 is a step of measuring the pitch of the alignment mark of the lower substrate 113 by the lower-substrate camera group 220. As shown in FIG. 5A, the lower vacuum chamber 100 is moved horizontally from the position Y1 to the position Y6 by the Y-axis servo mechanism 130. At the position Y6, the center of a view field 221 of the lower-substrate camera group 220 becomes consistent with a first lower-substrate alignment mark 113a of the lower substrate 113. The lower vacuum chamber 100 stops at the position Y6, images of the left and right marks of the first lower-substrate alignment mark 113a are captured by using the left lower-substrate camera 220a and the right lower-substrate camera 220b, and the position of the first lower-substrate alignment mark 113a is acquired by an image recognition device (e.g., the control unit 700 shown in FIG. 9B) which is connected to the lower-substrate camera group 220. Subsequently, the lower vacuum chamber 100 is horizontally moved from the position Y6 to the position Y7 by the Y-axis servo mechanism 130. As in the case of the position Y6, at the position Y7, the center of the view field 221 of the lower-substrate camera group 220 becomes consistent with a second lower-substrate alignment mark 113b of the lower substrate 113. After the lower vacuum chamber 100 stops at the position Y7, images of the left and right marks of the second lower-substrate alignment mark 113b are captured by using the left lower-substrate camera 220a and the right lower-substrate camera 220b, and the position of the second lower-substrate alignment mark 113b is acquired by the image recognition device (e.g., the control unit 700 shown in FIG. 9B) which is connected to the lower-substrate camera group 220.

STEP 9 is a step of adjusting the horizontal position of the lower substrate 113 by the lower surface plate XYθ slight moving mechanism 110. As shown in FIG. 5B, the XYθ horizontal shift amount of the alignment mark with respect to the measurement value of the pitch is calculated by using each of the positions of the first upper-substrate alignment mark 213a, the second upper-substrate alignment mark 213b, the first lower-substrate alignment mark 113a, and the second lower-substrate alignment mark 113b acquired by STEPS 6 and 8, the lower surface plate XYθ slight moving mechanism 110 is moved in the direction along which the XYθ horizontal shift amount is cancelled, and the position of the lower substrate 113 on the XYθ slight moving mechanism 110 is moved slightly in the horizontal direction. The lower surface plate XYθ slight moving mechanism 110 is formed as a highly precise driving mechanism which is capable of making a move in a unit of 0.1 μm in the XY direction and θ-rotation in a unit of 0.0001 degree.

STEP 10 is a step of forming the closed space 600 by connecting the upper vacuum chamber 200 to the lower vacuum chamber 100. As shown in FIG. 6A, the lower vacuum chamber 100 is moved horizontally from the position Y7 to the position Y3 by the Y-axis servo mechanism 130. Subsequently, the upper vacuum chamber 200 is brought down from the position Z1 to the position Z3 by the Z-axis servo mechanism 230. The position Z3 is a position higher than the position Z2 by several mm to several tens of mm, and a slight gap is provided between the upper substrate 213 and the lower substrate 113. Then, the upper vacuum chamber 200 is pressed against the lower vacuum chamber 100 by a lower pressing mechanism (not shown). The contact part between the upper vacuum chamber 200 and the lower vacuum chamber 100 is sealed by an O-ring type seal made with rubber or resin to secure the airtightness.

STEP 11 is a step of evacuating the inside of the vacuum chamber. As shown in FIG. 6B, the vacuum evacuation attaching/detaching mechanism 300 is connected to the vacuum evacuation port 310 provided on the side face of the lower vacuum chamber 100, and the air of the closed space 600 formed by the upper vacuum chamber 200 and the lower vacuum chamber 100 is adsorbed to have a vacuum state by using a vacuum pump (not shown) which is connected to the vacuum evacuation attaching/detaching mechanism 300. At this time, as described above, those chambers can be connected with high airtightness through pressing, against the flange port with O-ring of the vacuum evacuation port 310, the vacuum evacuation attaching/detaching mechanism 300 having a flange port in a same size as that of the vacuum evacuation port 310 horizontally by an air cylinder.

STEP 12 is a step of joining the upper substrate 213 and the lower substrate 113. As shown in FIG. 7A, after the vacuum degree inside the closed space 600 formed by the upper vacuum chamber 200 and the lower vacuum chamber 100 reaches the target value, the upper substrate 213 and the lower substrate 113 are pressurized and joined by the upper surface plate pressurizing mechanism 210. The upper surface plate pressurizing mechanism 210 is provided with a pressurizing power of about 0.1 MPa to 1.0 MPa by an air cylinder or a hydraulic mechanism.

STEP 13 is a step of irradiating UV light by the UV irradiation mechanism 114. This step is a case of using a UV curing resin called OCR as a lamination material. In a case of using an adhesive film called OCA as a lamination material, this step is unnecessary. As shown in FIG. 7B, in a case of using a UV curing resin as a joint material for joining the upper substrate 213 and the lower substrate 113, UV light is irradiated by the UV irradiation mechanism 114 after the upper substrate 213 and the lower substrate 113 come in contact, the UV curing resin provided between the upper substrate 213 and the lower substrate 113 is cured. Thereby, those substrates are joined.

STEP 14 is a step of releasing the air in the vacuum chamber. As shown in FIG. 8A, connection between the vacuum evacuation port 310 provided on the side face of the lower vacuum chamber 100 and the vacuum evacuation attaching/detaching mechanism 300 is released. Thereby, the closed space 600 formed between the upper vacuum chamber 200 and the lower vacuum chamber 100 comes to be in a normal pressure state because the air is introduced from the gap between the vacuum evacuation port 310 and the vacuum evacuation attaching/detaching mechanism 300. Connection between the vacuum evacuation port 310 and the vacuum evacuation attaching/detaching mechanism 300 can be released by inversely moving the air cylinder, in a case where the vacuum evacuation attaching/detaching mechanism 300 is horizontally pressed against the vacuum evacuation port 310 by the air cylinder in STEP 11, for example.

STEP 15 is a step of releasing the applied pressure between the upper vacuum chamber 200 and the lower vacuum chamber 100 to separate those chambers. As shown in FIG. 8B, the pressure applied by the upper surface plate pressurizing mechanism 210 is released to bring up the upper vacuum chamber 200 from the position Z3 to the position Z1 by the Z-axis servo mechanism 230. At this time, when the substrate fixing mechanism of the upper table 212 is released, a laminated substrate 400 that is acquired by laminating the upper substrate 213 and the lower substrate 113 is loaded on the lower table 112.

STEP 16 is a step of taking out the laminated substrate 400. As shown in FIG. 9A, the lower vacuum chamber 100 is moved from the position Y3 to the position Y1 by the Y-axis servo mechanism 130. Subsequently, the substrate fixing mechanism of the lower table 112 is released, and the laminated substrate 400 is taken out.

Through the actions of STEPS 1 to 16, the upper substrate 213 and the lower substrate 113 can be laminated under a vacuum environment. Thereby, it is possible to acquire the laminated substrate 400 laminated with a high alignment precision, which has no air bubbles mixed into the laminated surface.

Further, the direction along which the lower vacuum chamber 100 and the upper vacuum chamber 200 face with each other is not limited to the direction in parallel to the Z-axis direction that is the vertical direction but may also be directions in parallel to the X-axis direction and the Y-axis direction or may be arbitrary directions with respect to the XYZ axes.

As described above, with the substrate laminating apparatus 10, it is possible to save the space and cut the cost by reducing the number of mechanical components by employing the structure in which the upper-substrate camera group 120 for capturing images of the upper substrate 213 fixed to the upper vacuum chamber 200 is provided to the lower vacuum chamber 100, and images of the first upper-substrate alignment mark 213a and the second upper-substrate alignment mark 213b of the upper substrate 213 are captured through the action synchronized with the lower vacuum chamber 100.

It is assumed here that the lower vacuum chamber 100 and the upper-substrate camera group 120 are separate and individual structures. In that case, in STEP 6 that is the step of measuring the pitch of the first upper-substrate alignment mark 213a and the second upper-substrate alignment mark 213b, the highly precise mechanical component and control apparatus for moving the upper-substrate camera group 120 to the positions of the first upper-substrate alignment mark 213a and the second upper-substrate alignment mark 213b are required to be provided on the X-axis or the Y-axis. As a result, the cost is increased and, at the same time, spaces for placing the mechanical component and the control apparatus are required. This generates an obstruction for saving the space. In the meantime, the lower vacuum chamber 100 and the upper-substrate camera group 120 are unified in the structure of the substrate laminating apparatus 10, so that no such issue is generated.

With the related techniques, when there are a plurality of kinds in the size of the upper substrates, it is required to modify the number and size of the windows formed with light-transparent glass in accordance with the mark capturing positions of the upper substrate within the vacuum chamber. Further, with the related techniques, it is required to use the cameras that can bear the vacuum environment. In the meantime, with the structure of the substrate laminating apparatus 10, when there are a plurality of kinds in the size of the upper substrate 213, the space between the left upper-substrate camera 120a and the right upper-substrate camera 120b may be adjusted according to the size of the substrate through moving the left and right moving mechanisms provided on the side face of the lower vacuum chamber 100. Thus, with the substrate laminating apparatus 10, it is not necessary to perform modification and to use the cameras that can bear the vacuum environment even in the case where there are a plurality of kinds in the size of the upper substrates unlike the case of the related techniques. Therefore, it is possible to cut the cost.

While the case of using two cameras as the upper-substrate camera group 120 is described in the first exemplary embodiment, the number of the cameras is not limited to that. It is also possible to use only one camera or three or more cameras according to the alignment marks of the upper substrate 213. Further, while STEP 6 is shown as the step of measuring the pitch of the two alignment marks such as the first upper-substrate alignment mark 213a and the second upper-substrate alignment mark 213b, the step is not limited to that. In a case where there are three or more alignment marks in the upper substrate 213, the upper-substrate camera group 120 may be moved horizontally by the Y-axis servo 130 sequentially for each of the alignment marks for capturing the images thereof and the positions of the alignment marks may be acquired by the above-described image recognition device. Further, regarding the Y-axis servo mechanism 130, any types can be used as long as the prescribed precision can be maintained, e.g., the linear scale may be replaced with a measuring apparatus using laser interference.

Further, the lower vacuum chamber 100 and the upper vacuum chamber 200 are formed as a uniaxially moving structure that requires no move to the X-axis direction. Therefore, in addition to saving the space and reducing the cost of the components, such structure contributes to reducing the cost further since the assembling and adjusting step corresponding to the high precision is required only for one axis.

In other words, with the first exemplary embodiment, it is possible to save the space, lower the cost by reducing the number of mechanical components, and to achieve the high precision through employing the structure in which the first image capturing unit is provided to the first vacuum chamber, and the image of the second substrate alignment mark is captured by an action synchronized with the first vacuum chamber.

Modification Example

While the first exemplary embodiment employs a case in which the lower vacuum chamber is used as the first vacuum chamber, the upper vacuum chamber is used as the second vacuum chamber, and the camera for capturing the image of the upper substrate fixed to the second vacuum chamber is provided to the first vacuum chamber, the structure of the present invention is not limited only to that. For example, it is also possible to employ a structure in which the upper vacuum chamber is used as the first vacuum chamber, the lower vacuum chamber is used as the second vacuum chamber, and the camera for capturing the image of the lower substrate fixed to the second vacuum chamber is provided to the first vacuum chamber. This structure will be described hereinafter as a modification example.

FIG. 10 is a list of comparisons made between the main structural elements of the modification example and the structural elements of the first exemplary embodiment. As shown in FIG. 10, the modification example is a structure in which an upper vacuum chamber is used as the first vacuum chamber, a lower vacuum chamber is used as the second vacuum chamber, and a lower-substrate camera group as the first image capturing unit for capturing the image of the lower substrate fixed to the second vacuum chamber is provided to the first vacuum chamber. That is, this modification example is the structure in which the upper side and the lower side of the first exemplary embodiment are inversed.

However, in this modification example, there is a possibility of having a failure depending on the types of the lamination materials with the same actions as those of the first exemplary embodiment in the step of loading the substrates on the respective tables described in STEPS 1 and 7. For example, in a case where the lamination material is OCA, the optical substrate as the second substrate is loaded on the first table (the upper table) in STEP 1, the display panel as the first substrate to which OCA is laminated is loaded on the first table (the upper table) in STEP 7, and those substrates are laminated as in the case of the first exemplary embodiment. However, in a case where the lamination material is OCR, the surface of the display panel to which OCR is applied faces towards the lower side, if the optical substrate is loaded on the first table (the upper table) in STEP 1 and the display panel to which OCR is applied is loaded on the first table (the upper table) in STEP 7. Therefore, there is a possibility that the OCR material drops down due to the influence of the gravity.

Thus, when OCR is used as the lamination material in the structure of the modification example, following methods are effective. The first method is a laminating method with which the order for loading the substrates is changed, so that the display panel to which OCR is applied is loaded in STEP 1 and the optical substrate is loaded in STEP 7. The second method is a laminating method with which OCR is not applied to the display panel side but applied to the optical substrate side, the optical substrate to which OCR is applied is loaded on the first table (the upper table) in STEP 1, and the display panel is loaded on the first table (the upper table) in STEP 7. As described, when employing the structure of the modification example, it is desirable to select the above-described two methods. Thereby, the same effects as those of the first exemplary embodiment can be achieved also with the modification example.

As an exemplary advantage according to the invention, the present invention makes it possible to achieve the low cost and high precision by reducing the space and the number of mechanical components by employing the structure with which the image capturing unit is provided to the first vacuum chamber and the positional information is acquired by capturing the image of the second substrate by the action synchronized with the first vacuum chamber.

Second Exemplary Embodiment

FIG. 11 shows an example of the structure of a substrate laminating apparatus 20 according to a second exemplary embodiment. In the substrate laminating apparatus 20, the vacuum evacuation attaching/detaching mechanism 300 and the vacuum evacuation port 310 of the substrate laminating apparatus 10 according to the first exemplary embodiment shown in FIG. 1 are replaced with a longitudinal vacuum evacuation attaching/detaching mechanism 500 and a longitudinal vacuum evacuation port 510. Other structures of the substrate laminating apparatus 20 are the same as those of the substrate laminating apparatus 10, so that explanations thereof are omitted.

The flowchart of the actions of the substrate laminating apparatus 20 is the same as the one shown in FIG. 2. However, the actions regarding the peculiar structures of the second exemplary embodiment, i.e., STEPS 10 to 16 which are actions from vacuum evacuation of the closed space between the upper vacuum chamber 200 and the lower vacuum chamber 100 to lamination of the lower substrate 113 and the upper substrate 213, will be described by referring to FIG. 11 to FIG. 14.

Figure 12A:
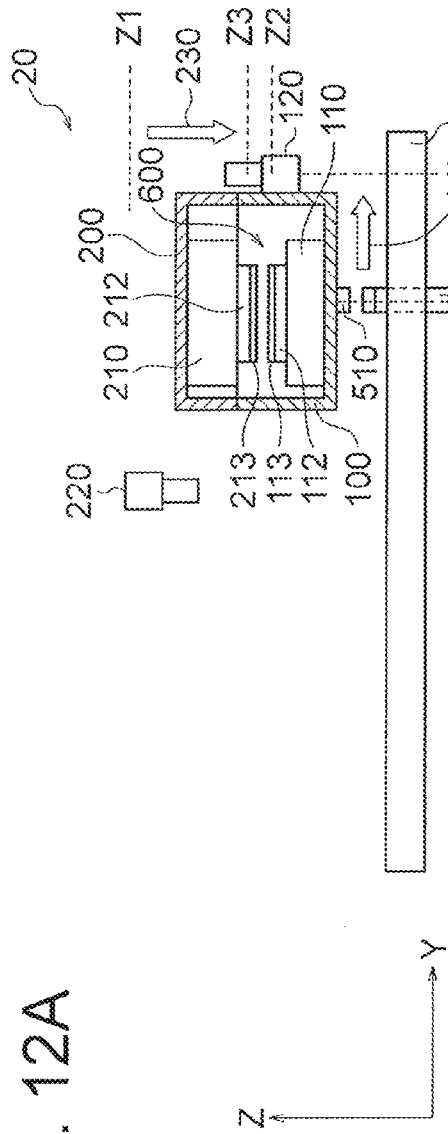

STEP 10 is a step of connecting the upper vacuum chamber 200 and the lower vacuum chamber 100. In FIG. 12A which shows STEP 10, the vacuum evacuation attaching/detaching mechanism 300 and the vacuum evacuation port 310 in FIG. 6A which shows STEP 10 of the first exemplary embodiment are replaced with the vacuum evacuation attaching/detaching mechanism 500 and the vacuum evacuation port 510. Other structures and actions are same as those shown in FIG. 6A.

Figure 12B:
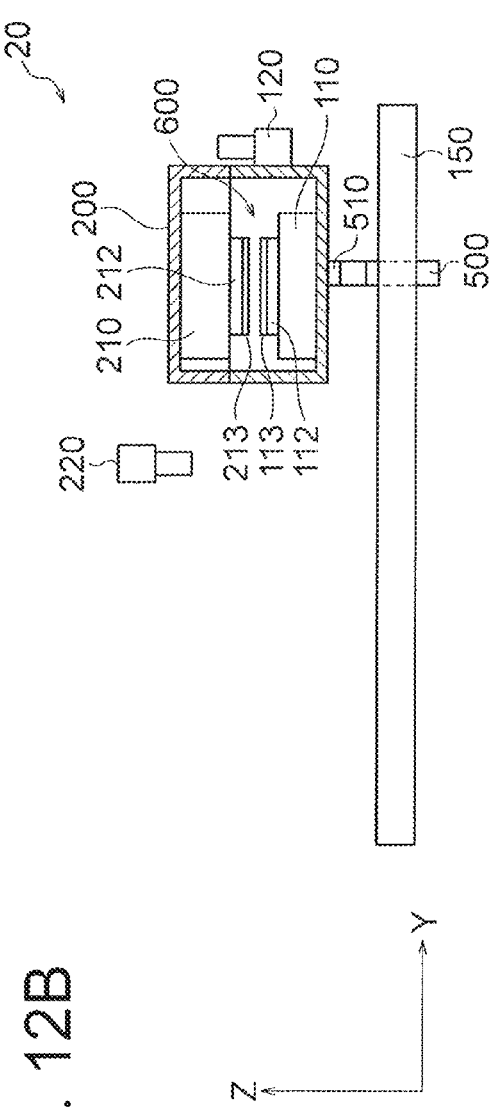
Figure 14:
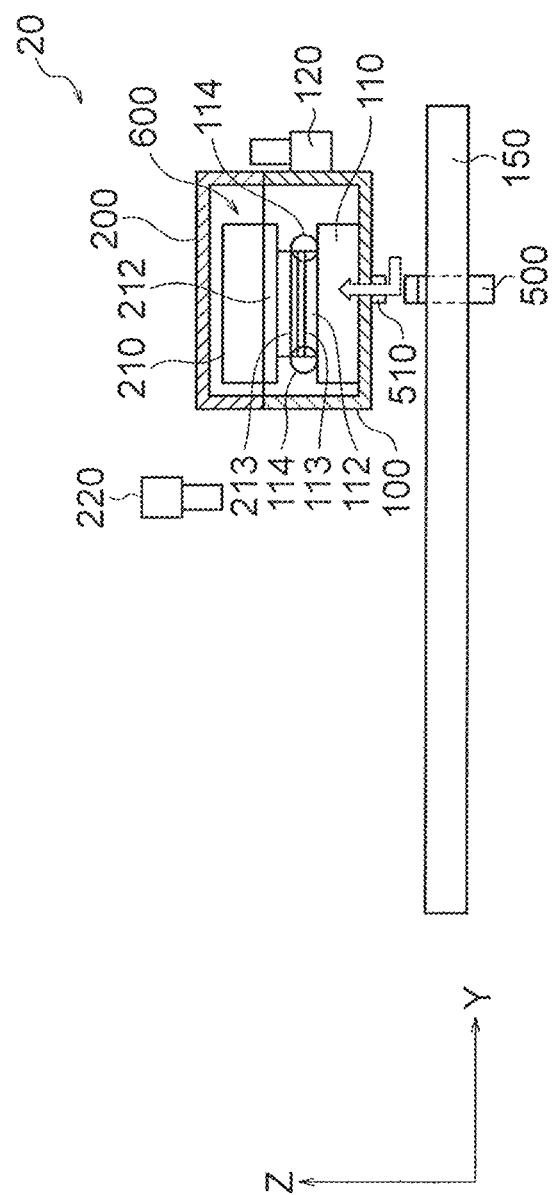
FIG. 14 is a side elevational view of the substrate laminating apparatus shown in FIGS. 11A and 11B, which shows the action of STEP 14 shown in FIG. 2.

STEP 11 is a step of evacuating the inside of the vacuum chamber. As shown in FIG. 12B, the longitudinal vacuum evacuation attaching/detaching mechanism 500 is connected to the longitudinal vacuum evacuation port 510 provided on the bottom face of the lower vacuum chamber 100, and the air of the closed space 600 formed by the upper vacuum chamber 200 and the lower vacuum chamber 100 is adsorbed to have a vacuum state by using a vacuum pump (not shown) which is connected to the longitudinal vacuum evacuation attaching/detaching mechanism 500. For example, the longitudinal vacuum evacuation port 510 includes a flange port with an O-ring for securing the airtightness at the time of mounting the longitudinal vacuum evacuation attaching/detaching mechanism 500. The longitudinal vacuum evacuation attaching/detaching mechanism 500 has a flange port in a same size as that of the flange port of the longitudinal vacuum evacuation port 510. Through pressing the longitudinal vacuum evacuation attaching/detaching mechanism 500 against the longitudinal vacuum evacuation port 510 in the Z-axis direction by the air cylinder, the airtightness can be secured by deformation of the O-ring to be fitted tightly. The direction to which the longitudinal vacuum evacuation attaching/detaching mechanism 500 is pressed against the longitudinal vacuum evacuation port 510 and the direction of the adsorption force generated when pressure-reducing evacuation is performed work only in the Z-axis direction.

Figure 16:
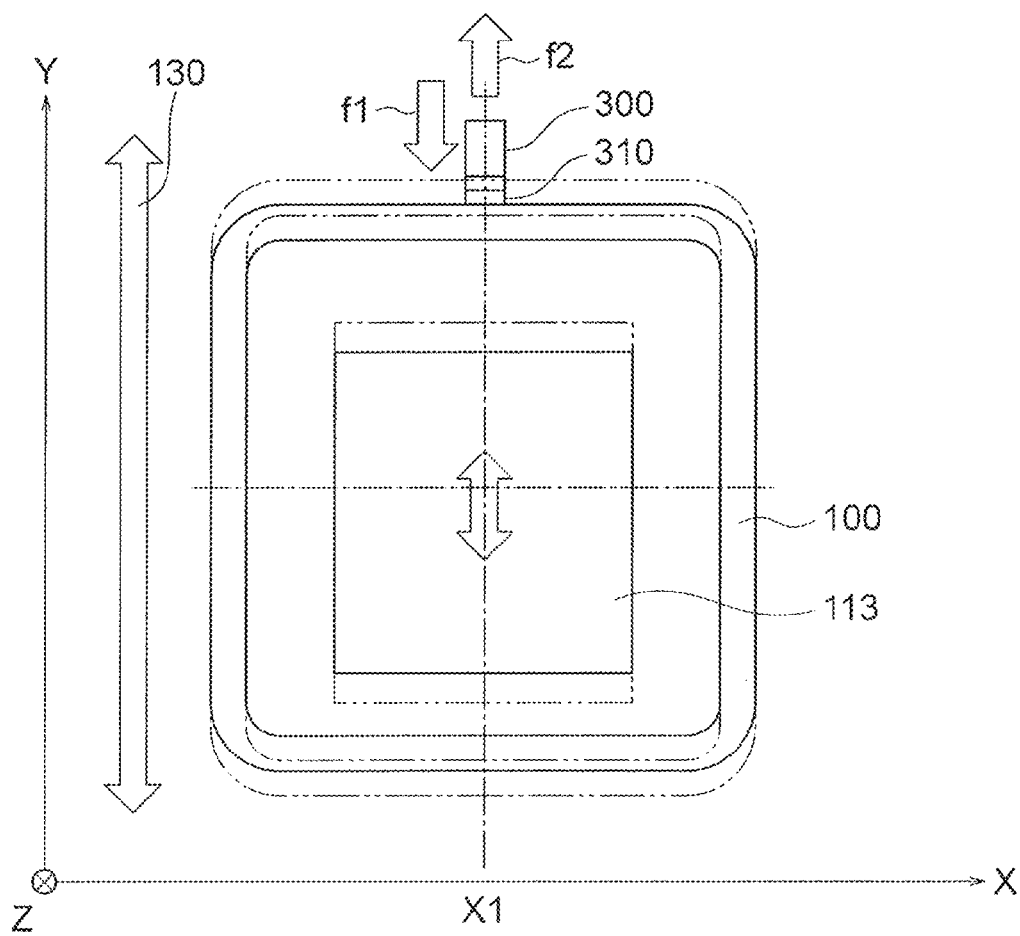
FIG. 16 is a plane view showing an influence of vacuum evacuation in the horizontal direction.

In the meantime, with the first exemplary embodiment described above, the vacuum evacuation attaching/detaching mechanism 300 is pressed horizontally against the vacuum evacuation port 310 provided to the side face of the lower vacuum chamber 100 by the air cylinder as shown in FIG. 6B and FIG. 16. It is assumed with this structure that the center line of the vacuum evacuation attaching/detaching mechanism 300 for the X-axis direction is consistent with the center line X1 of the lower vacuum chamber 100 for the X-axis direction. In that case, it is found regarding a pressing force f1 of the air cylinder and an adsorption force f2 generated due to reduced pressure that the pressing force f1 works on −Y side, the adsorption force f2 works on +Y side, and the composite force thereof works on the lower vacuum chamber 100. Therefore, position shift of the Y-axis servo mechanism 130 is generated by the composite force, so that the Y-axis precision is deteriorated.

Figure 17:
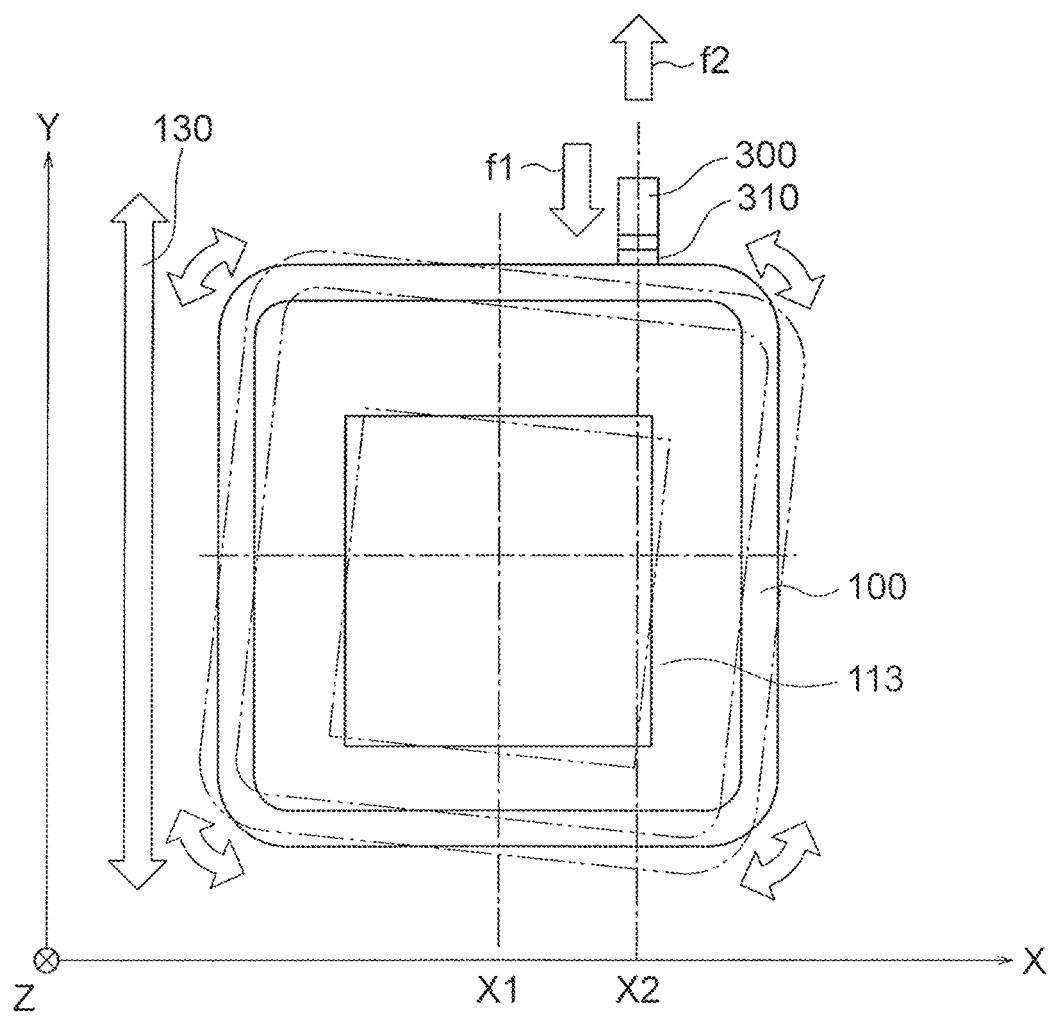
FIG. 17 is a plane view showing another influence of vacuum evacuation in the horizontal direction.

Further, the example shown in FIG. 17 is a case where the center line X2 of the vacuum evacuation attaching/detaching mechanism 300 for the X-axis direction is not consistent with the center line X1 of the lower vacuum chamber 100 for the X-axis direction. In that case, a shear force works on the XY-plane of the lower vacuum chamber 100 by the composite force of the pressing force f1 and the adsorption force f2. Thus, the lower vacuum chamber 100 is slightly rotated, so that the position precision of the lower substrate 113 is deteriorated further. Particularly, as described above by referring to FIG. 19A and FIG. 19B, in addition to the case where there is a lamination precision priority direction on the XY axes, it is desirable to avoid such structure with which the precision is deteriorated, when using an optical substrate such as a fly-eye lens having a function of distributing light to the two directions for the XY-axes, two lenticular lenses, or a liquid crystal lens.

In the meantime, through employing the structure with which the longitudinal vacuum evacuation attaching/detaching mechanism 500 is pressed against the lower vacuum chamber 100 in the Z-axis direction, the force in the XY-axes direction does not work on the lower vacuum chamber 100. Thus, it is possible to suppress position shift for the XY-plane and rotation generated due to the shear force. Therefore, in STEP 9, the lower substrate 113 on the XY-plane, which is loaded on the lower surface plate XYθ slight moving mechanism 110 that is the precision securing mechanism, can be maintained at the position where the adjustment of the slight move horizontal position is completed. Therefore, there is no influence of the shift for the upper substrate 213.

Figure 15:
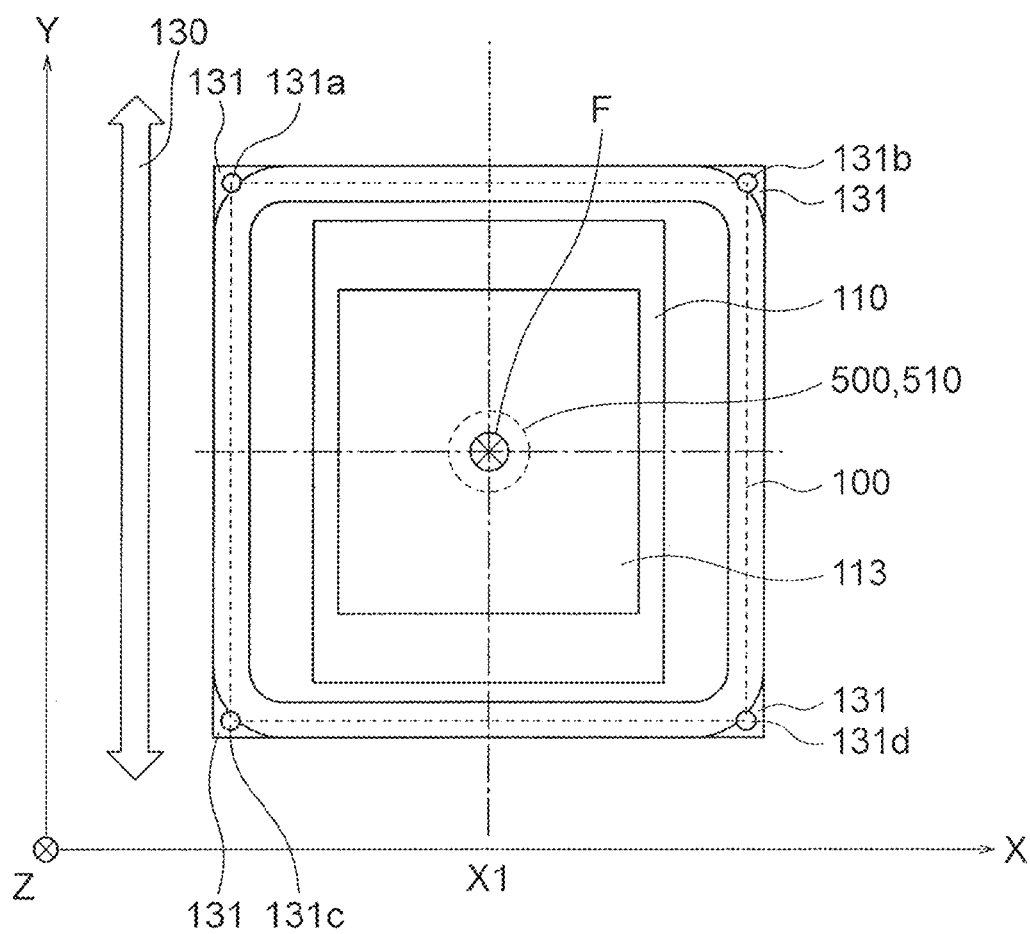
FIG. 15 is a plane view showing the position of a longitudinal vacuum evacuation port of the second exemplary embodiment.

As shown in FIG. 15, the position of the longitudinal vacuum evacuation port 510 on the XY-plane is desirable to be at the center of gravity of a polygon constituted with intersection points 131a, 131b, 131c, and 131d of the Y-axis servo fixing unit 131 in the outer peripheral part of the lower vacuum chamber 100 and the vicinity thereof. Note here that the "vicinity" indicates the range of 20% of the size of the bottom face. The reason thereof will be described hereinafter.

When the position of the longitudinal vacuum evacuation port 510 is largely isolated from the above-described center of gravity, there is generated inclination with respect to the XY-plane of the lower vacuum chamber 100 by the stress of the Z-axis direction applied to the bottom face of the lower vacuum chamber 100 based on the composite force F of the pressing force and the adsorption force. Thus, there is a concern that the lamination pressure distribution of the upper substrate 213 and the lower substrate 113 becomes nonuniform.

By studying the uniformity of the lamination pressure distribution, it was found that desired uniformity can be acquired when the position of the longitudinal vacuum evacuation port 510 on the XY-plane is roughly within a range of 20% of the size of the bottom face from the center of the bottom face of the lower vacuum chamber 100. This permissible range is effective when the longitudinal vacuum evacuation port 510 cannot be provided at the position of the center of gravity of the polygon, e.g., in a case where there is interference of the component of the Y-axis servo mechanism 130 or there is a component or the like of the lower surface plate XYθ slight move mechanism 110. Further, in a case where there is a component (not shown) inserted between the lower vacuum chamber 100 and the Y-axis servo fixing unit 131, the center of gravity of a polygon constituted with the intersection points 131a, - - - of the Y-axis servo fixing unit 131 and the inserted component can be substituted for the above-described center of gravity.

Using such structure is effective in terms of reducing the cost of the vacuum apparatus and saving the space. In general, a flexible pipe is used for connecting the movable lower vacuum chamber 100 and the vacuum pump of the second exemplary embodiment. As examples of the flexible pipes, there are flexible tubes for vacuum pipes, bellows, and the like, having a length determined by considering the maximum moving size and the minimum bending radius of the Y-axis servo mechanism 130. A housing space is necessary for the flexible pipes. As the housing space, considered is a case where a space is provided on the platform 150 in the vicinity of the lower vacuum chamber 100 along the moving direction of the Y-axis servo mechanism 130.

Unlike the typical structure, the second exemplary embodiment simply needs to consider the length of the detaching stroke of the longitudinal vacuum evacuation attaching/detaching mechanism 500 for the length of the flexible pipe because of the structure with which the longitudinal vacuum evacuation attaching/detaching mechanism 500 is pressed against the lower vacuum chamber 100 in the Z-axis direction. Thus, the cost for the vacuum apparatuses can be reduced. At the same time, the flexible pipe can be placed in a part of the occupying area of the lower vacuum chamber 100, so that it is possible to reduce the size of the platform 150. Therefore, compared to the case of the structural example of the typical vacuum pipe, it is possible with the second exemplary embodiment to reduce the cost for the vacuum apparatus and to save the space.

STEP 12 is a step of joining the upper substrate 213 and the lower substrate 113. In FIG. 13A which shows STEP 12, the vacuum evacuation attaching/detaching mechanism 300 and the vacuum evacuation port 310 in FIG. 7A which shows STEP 12 of the first exemplary embodiment are replaced with the longitudinal vacuum evacuation attaching/ detaching mechanism 500 and the longitudinal vacuum evacuation port 510. Other structures and actions are same as those shown in FIG. 7A.

STEP 13 is a step of irradiating UV light by the UV irradiation mechanism 114. In FIG. 13B which shows STEP 13, the vacuum evacuation attaching/detaching mechanism 300 and the vacuum evacuation port 310 in FIG. 7B which shows STEP 13 of the first exemplary embodiment are replaced with the longitudinal vacuum evacuation attaching/detaching mechanism 500 and the longitudinal vacuum evacuation port 510. Other structures and actions are same as those shown in FIG. 7B.

STEP 14 is a step of releasing the air in the vacuum chamber. As shown in FIG. 14A, connection between the longitudinal vacuum evacuation port 510 provided on the bottom face of the lower vacuum chamber 100 and the longitudinal vacuum evacuation attaching/detaching mechanism 500 is released. Thereby, the closed space 600 formed between the upper vacuum chamber 200 and the lower vacuum chamber 100 comes to be in a normal pressure state because the air is introduced from the gap between the longitudinal vacuum evacuation port 510 and the longitudinal vacuum evacuation attaching/detaching mechanism 500. Connection between the longitudinal vacuum evacuation port 510 and the longitudinal vacuum evacuation attaching/detaching mechanism 500 can be released by inversely moving the air cylinder, in a case where the longitudinal vacuum evacuation attaching/detaching mechanism 500 is horizontally pressed against the longitudinal vacuum evacuation port 510 by the air cylinder in STEP 11, for example.

In the above, the second exemplary embodiment employs the case where the lower vacuum chamber is used as the first vacuum chamber, the upper vacuum chamber is used as the second vacuum chamber, and the plane (the XY-plane) on which the precision securing mechanism exists is taken as the precision priority directions (X-axis, Y-axis), the direction along which the closed space constituted with the first vacuum chamber and the second vacuum chamber is evacuated is the Z-axis direction that is different from the precision priority directions (X-axis, Y-axis). However, the present invention is not limited to that structure. For example, in a case where the plane where the precision securing mechanism exists is taken as the plane including arbitrary two directions for the XYZ-axes, the direction along which the closed space constituted with the first vacuum chamber and the second vacuum chamber is evacuated is preferable to be different from the arbitrary two directions and is more preferable to be in a direction orthogonal to the arbitrary two directions. Further, while the structure in which connection for evacuating the vacuum chamber is done with the first vacuum chamber as the vacuum chamber in the second exemplary embodiment, the present invention is not limited to such case. It is also possible to employ a structure in which connection is done with the second vacuum chamber.

With the second exemplary embodiment, as described in the structures thereof and the actions including STEP 11, it is possible to reduce the cost for the vacuum apparatus and to save the space through placing the vacuum evacuation unit under the vacuum chamber and also to secure the precision since the shear force in the horizontal direction does not work on the upper and lower vacuum chambers. Other structures, operations, and effects of the second exemplary embodiment are the same as those of the first exemplary embodiment.

In other words, the second exemplary embodiment makes it possible to lower the cost and to save the space through placing the vacuum evacuation unit under the vacuum chamber and also to secure the precision since the shear force in the horizontal direction does not work on the first vacuum chamber and the second vacuum chamber. Furthermore, while the structures in which the precision securing mechanism is provided to the first vacuum chamber as the vacuum chamber are shown in the first exemplary embodiment and the second exemplary embodiment, the present invention is not limited to such case. It is also possible to employ a structure in which the precision securing mechanism is provided to the second vacuum chamber.

Third Exemplary Embodiment

Figure 18:
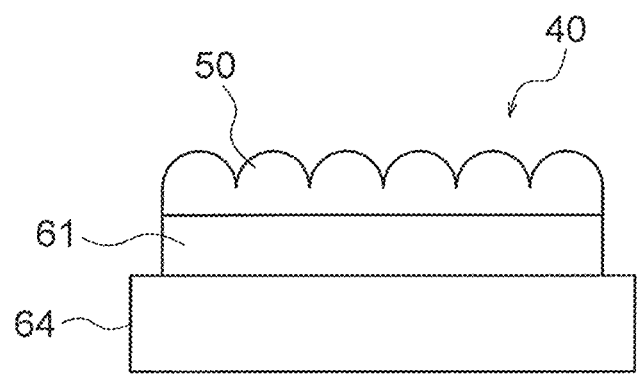
FIG. 18 is a side elevational view showing a stereoscopic display device according to a third exemplary embodiment.

FIG. 18 is a schematic view showing a stereoscopic image display device 40 in which the lenticular lens substrate 50 as the optical substrate is laminated to the display panel 64 via a lamination material 61 by using the substrate laminating apparatus according to the first and second exemplary embodiments. Since the optical substrate and the display panel are laminated in the order of μm as described above, it is possible to display a stereoscopic image of extremely high image quality.

While the third exemplary embodiment employs the case of using the lenticular substrate as the optical substrate, the same effects as the case of using the lenticular lens substrate can be acquired also in the cases of using a parallax barrier substrate, a fly-eye lens substrate, a liquid crystal lens substrate, and the like as the optical substrate. Further, as the display panel, it is possible to use an electro-optic element such as a liquid crystal display panel, an organic EL panel, or the like. Further, as the display panel, not only a planar panel but also a non-planar panel can also be applied to the present invention. In that case, tables with a surface shape that conforms to the surface shapes of the display panel and the optical substrate may be used as the first table and the second table of the first and second exemplary embodiments.

In other words, it is possible with the third exemplary embodiment to improve the 3D display quality by the highly precise lamination achieved by the first and second exemplary embodiments.

While the present invention has been described above by referring to each of the exemplary embodiments, the present invention is not limited only to the structures and actions of each of the exemplary embodiments described above but naturally includes various changes and modifications which can occur to those skilled in the art within the scope of the present invention. Further, the present invention includes the structures acquired by properly and mutually combining a part of or a whole part of the structures of each of the above-described exemplary embodiments.

While a part of or a whole part of the exemplary embodiments can be summarized as follows, the present invention is not limited only to the following structures.

(Supplementary Note 1) Minimum Structure (First Exemplary Embodiment)

A substrate laminating apparatus which includes:
a first vacuum chamber including a first opening;
a first table provided inside the first opening of the first vacuum chamber for holding a first substrate,
a second vacuum chamber including a second opening;
a second table provided inside the second opening of the second vacuum chamber for holding a second substrate;

a moving mechanism unit which moves the first vacuum chamber so that the first opening faces against the second opening to be able to form a closed space;

an image capturing unit provided on an outer side of the first opening of the first vacuum chamber to acquire positional information of the second substrate by being moved along with the first vacuum chamber by the moving mechanism unit and capturing an image of the second substrate that is held to the second table; and a control unit which laminates the first substrate held to the first table to the second substrate based on the positional information of the second substrate acquired by the image capturing unit.

(Supplementary Note 2) First Exemplary Embodiment (First Vacuum Chamber is Uniaxially Movable)

The substrate laminating apparatus as depicted in Supplementary Note 1, wherein when a substrate holding surface of the first table and the second table are defined as an XY-plane and a direction orthogonal to the XY-plane is defined as a Z-direction, a moving direction of the first vacuum chamber is only an arbitrary uniaxial direction on the XY-plane.

(Supplementary Note 3) First Exemplary Embodiment (Definition of Moving Direction of First Vacuum Chamber)

The substrate laminating apparatus as depicted in Supplementary Note 2, wherein when there is a direction along which priority is given on lamination precision when laminating the first substrate and the second substrate, and the direction is defined as a lamination precision priority direction, the moving direction of the first vacuum chamber is a direction different from the lamination precision priority direction.

(Supplementary Note 4) First Exemplary Embodiment (Definition 2 of Moving Direction of First Vacuum Chamber)

The substrate laminating apparatus as depicted in Supplementary Note 3, wherein the moving direction of the first vacuum chamber is orthogonal to the lamination precision priority direction.

(Supplementary Note 5) First Exemplary Embodiment (Definition 1 of Moving Direction of Second Vacuum Chamber)

The substrate laminating apparatus as depicted in any one of Supplementary Notes 2 to 4, wherein the moving direction of the second vacuum chamber does not exist on the XY-plane.

(Supplementary Note 6) First Exemplary Embodiment (Definition 2 of Moving Direction of Second Vacuum Chamber)

The substrate laminating apparatus as depicted in any one of Supplementary Notes 2 to 5, wherein the moving direction of the second vacuum chamber is only the Z-direction.

(Supplementary Note 7) First Exemplary Embodiment (First Vacuum Chamber=Lower Vacuum Chamber, Second Vacuum Chamber=Upper Vacuum Chamber)

The substrate laminating apparatus as depicted in any one of Supplementary Notes 1 to 6, wherein:

the first vacuum chamber is a vacuum chamber disposed on a lower side of the closed space; and the second vacuum chamber is a vacuum chamber disposed on an upper side of the closed space.

(Supplementary Note 8) First and Second Exemplary Embodiments (Vacuum Evacuation Direction)

A substrate laminating apparatus which includes:

a first vacuum chamber including a first opening;

a first table provided inside the first opening of the first vacuum chamber for holding a first substrate;

a second vacuum chamber including a second opening;

a second table provided inside the second opening of the second vacuum chamber for holding a second substrate, wherein the substrates are laminated by reducing a pressure in a closed space formed by having the first opening faced with the second opening, the substrate laminating apparatus further including:

a vacuum evacuation unit which is connected to the first vacuum chamber or the second vacuum chamber and performs reduced-pressure evacuation of the closed space, wherein:

when there is a direction along which priority is given on lamination precision when laminating the first substrate and the second substrate, and the direction is defined as a lamination precision priority direction, a reduced-pressure evacuation direction done by the vacuum evacuation unit is a direction different from the lamination precision priority direction.

(Supplementary Note 9) First and Second Exemplary Embodiments (Vacuum Evacuation Direction 2)

The substrate laminating apparatus as depicted in Supplementary Note 8, wherein:

a precision securing mechanism is provided on the first table or the second table;

a direction along which the precision securing mechanism operates is defined as the lamination precision priority direction; and the reduced-pressure evacuation direction is a direction different from the lamination precision priority direction.

(Supplementary Note 10) First and Second Exemplary Embodiments (Vacuum Evacuation Direction 3)

The substrate laminating apparatus as depicted in Supplementary Note 8 or 9, wherein the lamination precision priority direction is substantially orthogonal to the reduced-pressure evacuation direction.

(Supplementary Note 11) First Exemplary Embodiment (Definition of Moving Direction of First Vacuum Chamber)

The substrate laminating apparatus as depicted in any one of Supplementary Notes 8 to 10, wherein the moving direction of the first vacuum chamber is substantially in parallel to the reduced-pressure evacuation direction.

(Supplementary Note 12) Second Exemplary Embodiment (Definition 1 of Moving Direction of Second Vacuum Chamber)

The substrate laminating apparatus as depicted in any one of Supplementary Notes 8 to 11, wherein
the moving direction of the second vacuum chamber is only the reduced-pressure evacuation direction.

(Supplementary Note 13) Second Exemplary Embodiment (First Vacuum Chamber=Lower Vacuum Chamber, Second Vacuum Chamber=Upper Vacuum Chamber)

The substrate laminating apparatus as depicted in any one of Supplementary Notes 8 to 12, wherein:
the first vacuum chamber is a vacuum chamber disposed on a lower side of the closed space; and
the second vacuum chamber is a vacuum chamber disposed on an upper side of the closed space.

Supplementary Note 14

The substrate laminating apparatus as depicted in any one of Supplementary Notes 1 to 13, wherein:
the first substrate is one out of an optical substrate and a display panel; and
the second substrate is the other one of the optical substrate and the display panel.

Supplementary Note 15

A substrate laminating method used with a substrate laminating apparatus which includes:
a first vacuum chamber including a first opening;
a first table provided inside the first opening of the first vacuum chamber for holding a first substrate;
a second vacuum chamber including a second opening;
a second table provided inside the second opening of the second vacuum chamber for holding a second substrate;
a moving mechanism unit which moves the first vacuum chamber so that the first opening faces against the second opening to be able to form a closed space;
an image capturing unit provided on an outer side of the first opening of the first vacuum chamber, and the method including:
moving the image capturing unit along the first vacuum chamber by the moving mechanism unit;
acquiring positional information of the second substrate through capturing an image of the second substrate that is held to the second table by using the image capturing unit; and
laminating the first substrate held to the first table to the second substrate based on the positional information of the second substrate acquired thereby.

(Supplementary Note 16) First Exemplary Embodiment (Image Capturing Step)

A substrate laminating method used with a substrate laminating apparatus which includes:
a first vacuum chamber having a first table which holds a first substrate;
a second vacuum chamber having a second table which holds a second substrate; and
an image capturing unit which is provided to the first vacuum chamber and reads out positional information of the second substrate, wherein: when substrate holding surfaces of the first table and the second table are defined as an XY-plane and a direction orthogonal to the XY-plane is defined as a Z-direction, a moving direction of the first vacuum chamber is only an arbitrary uniaxial direction on the XY-plane; and the first substrate and the second substrate are laminated by reducing a pressure inside a closed space formed by the first vacuum chamber and the second vacuum chamber, the method including:
a first step of having the first vacuum chamber located at a substrate holding position and having the second substrate held to the first table;
a second step of moving the first vacuum chamber including the second substrate to a closed space forming position at which the second vacuum chamber is located in the Z-direction along the moving direction from the substrate holding position;
a third step of bringing down the second vacuum chamber in the Z-direction, and moving the second substrate to the second table from the first table;
a fourth step of bringing up the second vacuum chamber in the Z-direction;
a fifth step of returning the first vacuum chamber to the substrate holding position from the closed space forming position; and
a sixth step of capturing an image of a mark of the second substrate by the image capturing unit unified with the first vacuum chamber, when performing the fifth step.

(Supplementary Note 17) First Exemplary Embodiment (Control Unit of First Image Capturing Unit)

The substrate laminating method as depicted in Supplementary Note 16, wherein
in the sixth step, the image capturing unit captures images of the mark of the second substrate at least at two positions along the moving direction of the first vacuum chamber.

(Supplementary Note 18) Third Exemplary Embodiment

A stereoscopic image display device manufactured by using the substrate laminating method as depicted in any one of Supplementary Notes 15 to 17.

(Supplementary Note 21) Minimum Structure (First Exemplary Embodiment)

A substrate laminating apparatus which includes:
a first vacuum chamber having a first table which holds a first substrate; and
a second vacuum chamber having a second table which holds a second substrate, wherein the substrates are laminated by using an adhesive film or an adhesive through reducing a pressure inside a closed space that is formed by the first vacuum chamber and the second vacuum chamber, the substrate laminating apparatus further including:
a moving mechanism which is provided to the first vacuum chamber for forming the closed space between with the second vacuum chamber; and a first image capturing unit which is provided on an outer side of the first vacuum chamber where the closed space is not formed and reads out positional information of the second substrate, wherein the first image capturing unit includes a function which captures an image of the second substrate at a position of the first vacuum chamber where the closed space is not formed and extracts the positional information from the captured image.

(Supplementary Note 22) First Exemplary Embodiment (First Vacuum Chamber is Uniaxially Movable)

The substrate laminating apparatus as depicted in Supplementary Note 21, wherein when a substrate holding surface of the first table and the second table are defined as an XY-plane and a direction orthogonal to the XY-plane is defined as a Z-direction, a moving direction of the first vacuum chamber is only an arbitrary uniaxial direction on the XY-plane.

(Supplementary Note 23) First Exemplary Embodiment (Definition of Moving Direction of First Vacuum Chamber)

The substrate laminating apparatus as depicted in Supplementary Note 22, wherein when there is a direction along which priority is given on lamination precision when laminating the first substrate and the second substrate, and the direction is defined as a lamination precision priority direction, the moving direction of the first vacuum chamber is a direction different from the lamination precision priority direction.

(Supplementary Note 24) First Exemplary Embodiment (Definition 2 of Moving Direction of First Vacuum Chamber)

The substrate laminating apparatus as depicted in Supplementary Note 23, wherein the moving direction of the first vacuum chamber is orthogonal to the lamination precision priority direction.

(Supplementary Note 25) First Exemplary Embodiment (Definition 1 of Moving Direction of Second Vacuum Chamber)

The substrate laminating apparatus as depicted in any one of Supplementary Notes 22 to 24, wherein the moving direction of the second vacuum chamber does not exist on the XY-plane.

(Supplementary Note 26) First Exemplary Embodiment (Definition 2 of Moving Direction of Second Vacuum Chamber)

The substrate laminating apparatus as depicted in any one of Supplementary Notes 22 to 25, wherein the second vacuum chamber moves only in the Z-direction.

(Supplementary Note 27) First Exemplary Embodiment (Control Unit of First Image Capturing Unit)

The substrate laminating apparatus as depicted in any one of Supplementary Notes 21 to 26, wherein the first image capturing unit captures images of the second substrate existing in a direction perpendicular to the moving direction of the first vacuum chamber at least at two positions for the moving direction of the first vacuum chamber.

(Supplementary Note 28) First Exemplary Embodiment (First Vacuum Chamber=Lower Vacuum Chamber, Second Vacuum Chamber=Upper Vacuum Chamber)

The substrate laminating apparatus as depicted in any one of Supplementary Notes 21 to 27, wherein:

the first vacuum chamber is a vacuum chamber disposed on a lower side of the closed space; and the second vacuum chamber is a vacuum chamber disposed on an upper side of the closed space.

(Supplementary Note 29) First and Second Exemplary Embodiments (Vacuum Evacuation Direction)

A substrate laminating apparatus which includes:

a first vacuum chamber having a first table which holds a first substrate; and a second vacuum chamber having a second table which holds a second substrate, wherein the substrates are laminated by using an adhesive film or an adhesive through reducing a pressure inside a closed space that is formed by the first vacuum chamber and the second vacuum chamber, the substrate laminating apparatus further including:

a vacuum evacuation unit which is connected to the first vacuum chamber or the second vacuum chamber and reduces the pressure of the closed space, wherein when defining that, in a case where there is a direction along which priority is given on lamination precision when laminating the first substrate and the second substrate, the direction is a lamination precision priority direction, a reduced-pressure evacuation direction done by the vacuum evacuation unit is a direction different from the lamination precision priority direction.

(Supplementary Note 30) First and Second Exemplary Embodiments (Vacuum Evacuation Direction 2)

The substrate laminating apparatus as depicted in Supplementary Note 29 further includes a precision securing mechanism is provided on the first table or the second table, wherein:

a direction along which the precision securing mechanism operates is defined as the lamination precision priority direction; and the reduced-pressure evacuation direction is a direction different from the lamination precision priority direction.

(Supplementary Note 31) First and Second Exemplary Embodiments (Vacuum Evacuation Direction 3)

The substrate laminating apparatus as depicted in Supplementary Note 29 or 30, wherein the lamination precision priority direction is substantially orthogonal to the reduced-pressure evacuation direction.

(Supplementary Note 32) First Exemplary Embodiment (Definition of Moving Direction of First Vacuum Chamber)

The substrate laminating apparatus as depicted in any one of Supplementary Notes 29 to 31, wherein
the moving direction of the first vacuum chamber is substantially in parallel to the reduced-pressure evacuation direction.

(Supplementary Note 33) Second Exemplary Embodiment (Definition 1 of Moving Direction of Second Vacuum Chamber)

The substrate laminating apparatus as depicted in any one of Supplementary Notes 29 to 32, wherein
the moving direction of the second vacuum chamber is only the reduced-pressure evacuation direction.

(Supplementary Note 34) Second Exemplary Embodiment (First Vacuum Chamber=Lower Vacuum Chamber, Second Vacuum Chamber=Upper Vacuum Chamber)

The substrate laminating apparatus as depicted in any one of Supplementary Notes 29 to 33, wherein:
the first vacuum chamber is a vacuum chamber disposed on a lower side of the closed space; and
the second vacuum chamber is a vacuum chamber disposed on an upper side of the closed space.

Supplementary Note 35

The substrate laminating apparatus as depicted in any one of Supplementary Notes 21 to 34, wherein:
the first substrate is one out of an optical substrate and a display panel; and
the second substrate is the other one of the optical substrate and the display panel.

(Supplementary Note 36) First Exemplary Embodiment (Image Capturing Step)

A substrate laminating method used with a substrate laminating apparatus which includes:
a first vacuum chamber having a first table which holds a first substrate;
a second vacuum chamber having a second table which holds a second substrate; and
a first image capturing unit which is provided to the first vacuum chamber and reads out positional information of the second substrate, wherein: when substrate holding surfaces of the first table and the second table are defined as an XY-plane and a direction orthogonal to the XY-plane is defined as a Z-direction, a moving direction of the first vacuum chamber is only an arbitrary uniaxial direction on the XY-plane; and the first substrate and the second substrate are laminated by reducing a pressure inside a closed space formed by the first vacuum chamber and the second vacuum chamber, the method including:
a first step of having the first vacuum chamber located at a substrate holding position and having the second substrate held to the first table;
a second step of moving the first vacuum chamber including the second substrate to a closed space forming position at which the second vacuum chamber is located in the Z-direction along the moving direction from the substrate holding position;
a third step of bringing down the second vacuum chamber in the Z-direction, and moving the second substrate to the second table from the first table;
a fourth step of bringing up the second vacuum chamber in the Z-direction;
a fifth step of returning the first vacuum chamber to the substrate holding position from the closed space forming position; and
a sixth step of capturing an image of a mark of the second substrate by the first image capturing unit unified with the first vacuum chamber, when performing the fifth step.

(Supplementary Note 37) Third Exemplary Embodiment

A stereoscopic image display device manufactured by using the substrate laminating method as depicted in Supplementary Note 36.

What is claimed is:
1. A substrate laminating apparatus, comprising:
a first vacuum chamber including a first opening;
a first table provided inside the first opening of the first vacuum chamber for holding a first substrate,
a second vacuum chamber including a second opening;
a second table provided inside the second opening of the second vacuum chamber for holding a second substrate;
a moving mechanism unit which moves the first vacuum chamber so that the first opening faces against the second opening to be able to form a closed space;
an image capturing unit provided on an outer side of the first opening of the first vacuum chamber to acquire positional information of the second substrate by being moved along with the first vacuum chamber by the moving mechanism unit and capturing an image of the second substrate that is held to the second table; and
a control unit which laminates the first substrate held to the first table to the second substrate based on the positional information of the second substrate acquired by the image capturing unit, wherein
when a substrate holding surface of the first table and the second table are defined as an XY-plane formed by an X-axis direction and a Y-axis direction orthogonal to each other and a direction orthogonal to the XY-plane is defined as a Z-axis direction, a moving direction of the first vacuum chamber is only the Y-axis direction; and
the image capturing unit is provided on the outer side of the first vacuum chamber and on a plane orthogonal to the Y-axis direction, wherein:
the first substrate is one out of a lenticular lens substrate and a display panel;
the second substrate is the other one of the lenticular lens substrate and the display panel; and
the lenticular lens substrate is held to the first table or the second table so that a direction in which a cylindrical lens constituting the lenticular lens substrate distributes light is consistent with the X-axis direction.
2. The substrate laminating apparatus as claimed in claim 1, wherein
the moving direction of the second vacuum chamber does not exist on the XY-plane.

3. The substrate laminating apparatus as claimed in claim 1, wherein
the moving direction of the second vacuum chamber is only the Z-axis direction.

4. The substrate laminating apparatus as claimed in claim 1, wherein:
the first vacuum chamber is a vacuum chamber disposed on a lower side of the closed space; and
the second vacuum chamber is a vacuum chamber disposed on an upper side of the closed space.

5. The substrate laminating apparatus as claimed in claim 1, wherein:
the second substrate comprises an alignment mark which can be observed from the second opening; and
the image capturing unit captures an image of the alignment mark at a position halfway in movement of the first vacuum chamber.

6. A substrate laminating method used with a substrate laminating apparatus which comprises:
a first vacuum chamber including a first opening;
a first table provided inside the first opening of the first vacuum chamber for holding a first substrate;
a second vacuum chamber including a second opening;
a second table provided inside the second opening of the second vacuum chamber for holding a second substrate;
a moving mechanism unit which moves the first vacuum chamber so that the first opening faces against the second opening to be able to form a closed space;
an image capturing unit provided on an outer side of the first opening of the first vacuum chamber, the method comprising:
moving the image capturing unit along with the first vacuum chamber by the moving mechanism unit;
acquiring positional information of the second substrate through capturing an image of the second substrate that is held to the second table by using the image capturing unit; and
laminating the first substrate held to the first table to the second substrate based on the positional information of the second substrate acquired thereby, wherein
when a substrate holding surface of the first table and the second table are defined as an XY-plane formed by an X-axis direction and a Y-axis direction orthogonal to each other and a direction orthogonal to the XY-plane is defined as a Z-axis direction, a moving direction of the first vacuum chamber is only the Y-axis direction; and
the image capturing unit is provided on the outer side of the first opening of the first vacuum chamber and on a plane orthogonal to the Y-axis direction,
wherein:
the first substrate is one out of a lenticular lens substrate and a display panel;
the second substrate is the other one of the lenticular lens substrate and the display panel; and
the lenticular lens substrate is held to the first table or the second table so that a direction in which a cylindrical lens constituting the lenticular lens substrate distributes light is consistent with the X-axis direction.

7. A stereoscopic image display device manufactured by using the substrate laminating method as claimed in claim 6.

\* \* \* \* \*